United States Patent
Kosaka et al.

(10) Patent No.: US 10,283,158 B2
(45) Date of Patent: May 7, 2019

(54) DISC ARCHIVE APPARATUS

(71) Applicant: SONY CORPORATION, Tokyo (JP)

(72) Inventors: Hidehiro Kosaka, Kanagawa (JP); Takeshi Kubo, Kanagawa (JP); Koichi Ishihara, Shizuoka (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/736,557

(22) PCT Filed: May 18, 2016

(86) PCT No.: PCT/JP2016/002431
§ 371 (c)(1),
(2) Date: Dec. 14, 2017

(87) PCT Pub. No.: WO2016/208117
PCT Pub. Date: Dec. 29, 2016

(65) Prior Publication Data
US 2018/0174608 A1    Jun. 21, 2018

(30) Foreign Application Priority Data

Jun. 22, 2015 (JP) ................................ 2015-124589
Oct. 16, 2015 (JP) ................................ 2015-204510

(51) Int. Cl.
*G11B 17/22* (2006.01)
*G11B 17/028* (2006.01)
(Continued)

(52) U.S. Cl.
CPC ........ *G11B 17/0288* (2013.01); *G11B 17/041* (2013.01); *G11B 17/221* (2013.01);
(Continued)

(58) Field of Classification Search
None
See application file for complete search history.

(56) References Cited

U.S. PATENT DOCUMENTS 5,757,738 A * 5/1998 Ohba ................... G11B 15/688
312/9.31
8,873,356 B2 * 10/2014 Yamazaki ............ G11B 17/221
369/30.78
(Continued)

FOREIGN PATENT DOCUMENTS

AU    2002257762 A1    10/2003
CA       2460684 A1    10/2003
(Continued)

OTHER PUBLICATIONS

International Search Report and Written Opinion of PCT Application No. PCT/JP2016/002431, dated Aug. 23, 2017, 08 pages of ISRWO.

*Primary Examiner* — William J Klimowicz
(74) *Attorney, Agent, or Firm* — Chip Law Group

(57) ABSTRACT

Provided is a disc archive apparatus, including: a tray conveying robot that selects a specified disc tray and conveys the specified disc tray; a rotatable turn table, the disc tray conveyed by the tray conveying robot being placed on the rotatable turn table; a disc conveying picker for placing the discs from the disc tray placed on the turn table into the plurality of drives of the disc drive; and a controller that controls an operation, in which the controller performs a control operation including performing processing including recording or reproduction on/from the disc taken out from a disc tray currently placed on a first area of the turn table, rotating the turn table thereafter, and performing processing including recording or reproduction on/from a next disc tray placed on a second area of the turn table.

13 Claims, 30 Drawing Sheets

Figure 1:
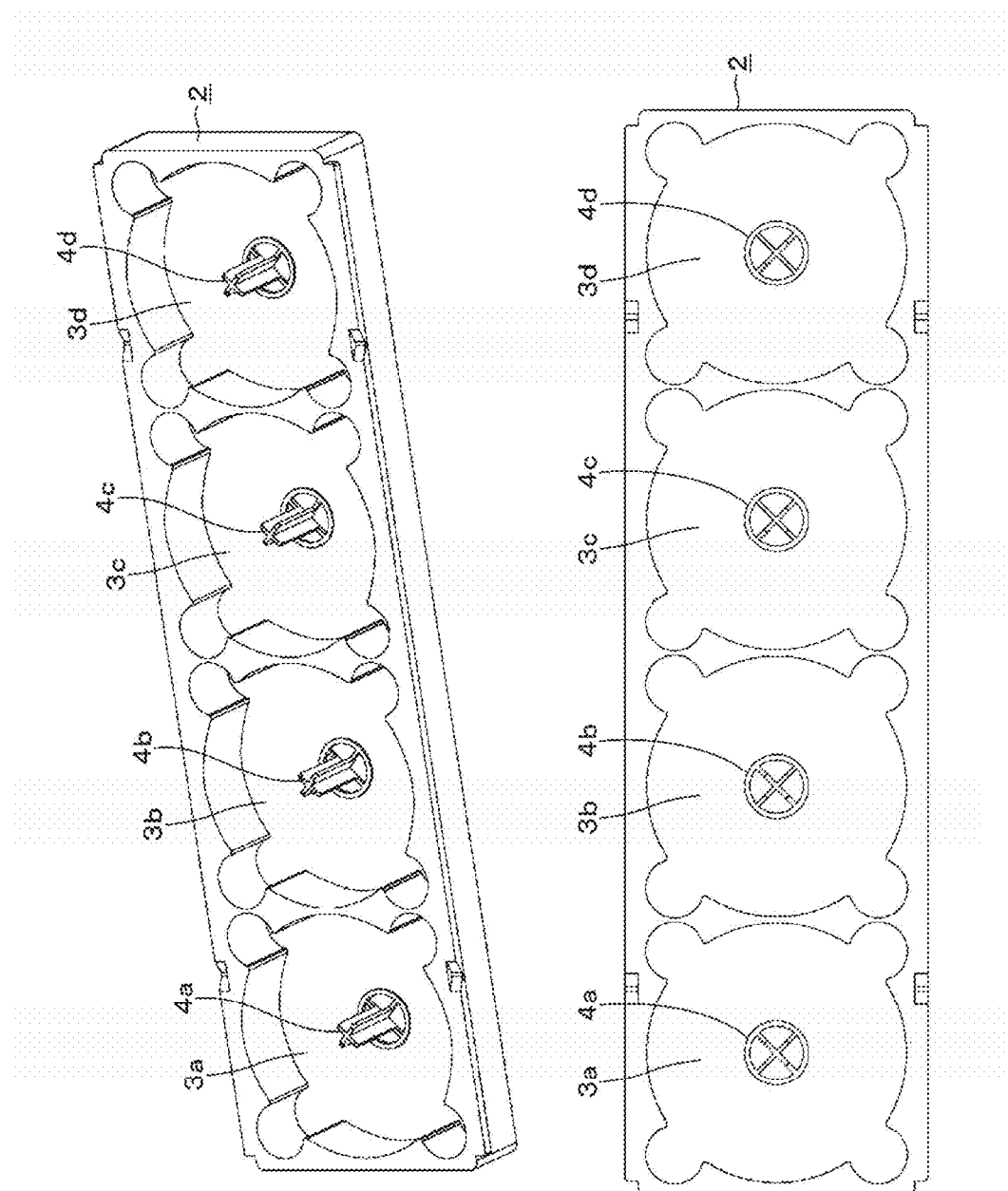

(51) Int. Cl.
*G11B 23/023* (2006.01)
*G11B 23/03* (2006.01)
*G11B 17/041* (2006.01)
*G11B 17/30* (2006.01)
*G11B 33/12* (2006.01)
*G11B 17/056* (2006.01)

(52) U.S. Cl.
CPC ............ *G11B 17/226* (2013.01); *G11B 17/30* (2013.01); *G11B 23/023* (2013.01); *G11B 23/03* (2013.01); *G11B 23/0323* (2013.01); *G11B 33/12* (2013.01); *G11B 17/056* (2013.01)

(56) References Cited

U.S. PATENT DOCUMENTS

| | | | | |
|---|---|---|---|---|
| 8,881,184 | B2* | 11/2014 | Yoshida | G11B 17/22 720/612 |
| 2004/0105187 | A1* | 6/2004 | Woodruff | G11B 15/6825 360/92.1 |
| 2004/0264037 | A1* | 12/2004 | Downey | G11B 15/6835 360/92.1 |
| 2004/0264038 | A1* | 12/2004 | Heineman | G11B 15/6835 360/92.1 |
| 2005/0007692 | A1* | 1/2005 | Thompson | G11B 15/6835 360/93 |
| 2005/0024996 | A1 | 2/2005 | Schumacher | |
| 2008/0288969 | A1* | 11/2008 | Waiman | B41J 3/4071 720/615 |
| 2009/0028010 | A1* | 1/2009 | Nishioka | B41J 3/4071 369/30.32 |
| 2011/0283299 | A1* | 11/2011 | Takano | G11B 17/225 720/603 |
| 2012/0250475 | A1 | 10/2012 | Inatani et al. | |
| 2013/0263162 | A1* | 10/2013 | Yoshida | G11B 17/22 720/615 |
| 2013/0326548 | A1* | 12/2013 | Chihara | G11B 17/053 720/615 |
| 2015/0074692 | A1* | 3/2015 | Yoshida | G11B 23/0323 720/615 |

FOREIGN PATENT DOCUMENTS

| | | |
|---|---|---|
| CN | 1618099 A | 5/2005 |
| CN | 102737668 A | 10/2012 |
| EP | 1493151 A1 | 1/2005 |
| EP | 2506257 A2 | 10/2012 |
| JP | 05-189912 A | 7/1993 |
| JP | 2000-235774 A | 8/2000 |
| JP | 2005-527059 A | 9/2005 |
| JP | 2008-186539 A | 8/2008 |
| JP | 2012-208977 A | 10/2012 |
| JP | 2014-013639 A | 1/2014 |
| WO | 2003/085663 A1 | 10/2003 |

* cited by examiner

DISC ARCHIVE APPARATUS

CROSS REFERENCE TO RELATED APPLICATIONS

This application is a U.S. National Phase of International Patent Application No. PCT/JP 2016/002431 filed on May 18, 2016, which claims priority benefit of Japanese Patent Application No. JP 2015-124589 filed in the Japan Patent Office on Jun. 22, 2015 and also claims priority benefit of Japanese Patent Application No. JP 2015-204510 filed in the Japan Patent Office on Oct. 16, 2015 Each of the above-referenced applications is hereby incorporated herein by reference in its entirety.

TECHNICAL FIELD

The present technology relates to an archive apparatus that uses a high-capacity optical disc.

BACKGROUND ART

An archive apparatus that uses a high-capacity optical disc (referred to simply as disc) is put into practical use. Examples of a storage apparatus in a data center include those using a magnetic tape as a medium. The disc is suitable for a cold archive aimed at long-term storage as compared with the magnetic tape. For example, in the following Patent Document 1, an archive apparatus capable of housing 12 discs in a magazine and handling them in units of magazines is described.

Patent Document 1: Japanese Patent Application Laid-open No. 2014-13639

SUMMARY

Problem to be Solved

As described in Patent Document 1 housing 12 discs in one magazine has advantages in that the number of discs that can be accessed at a time increases and it is possible to record or reproduce a large amount of data at a time as compared with the case where discs are inserted into drives one by one. In the data center, however, it is desired to record or reproduce a larger amount of data. Further, in Patent Document 1, a magazine taken out from a magazine stack is conveyed to a disc carrier by a magazine carrier, and 12 discs in the magazine are inserted into 12 drive units by the disc carrier. When recording or reproduction is finished, the 12 discs are housed in the magazine again, and the magazine is housed in the magazine stack. After that, in order to record or reproduce the next discs, the next magazine is selected and the discs are inserted into drive units.

However, there is a problem in which the time necessary for housing a magazine for which recording or reproduction is finished in a magazine stack and taking out a new magazine from the magazine stack is wasted time during from when processing on optical discs in one magazine is finished to when processing for the next magazine is started, and it takes longer time to perform processing.

In view of the above, it is an object of the present technology to provide an archive apparatus capable of increasing the number of discs that can be handled at a time, and reducing the time necessary for replacing disc containers with each other.

Means for Solving the Problem

According to an embodiment of the present technology, there is provided a disc archive apparatus, including:

disc trays each capable of housing N columns of M stacked discs (N and M each indicate a positive integer not less than two);

one or more disc tray racks that each house the disc trays;

a tray conveying robot that selects a specified disc tray from the one or more disc tray racks and conveys the specified disc tray;

a rotatable turn table, the disc tray conveyed by the tray conveying robot being placed on the rotatable turn table;

a disc drive including a plurality of drives arranged in an (M×N) matrix pattern;

a disc conveying picker for placing the discs from the disc tray placed on the turn table into the plurality of drives of the disc drive, the disc conveying picker being between the turn table and the disc drive; and a controller that controls an operation, in which the controller performs a control operation including performing processing including recording or reproduction on/from the disc taken out from a disc tray currently placed on a first area of the turn table, rotating the turn table thereafter, and performing processing including recording or reproduction on/from a next disc tray placed on a second area of the turn table.

Effects

According to at least one embodiment, because (N columns×M) discs are housed in a disc tray, it is possible to increase the number of discs that can be handled at a time, and perform processing on a large amount of data in a short time. Further, because a disc tray can be switched only by turning a turn table, it is possible to quickly switch the disc tray. Note that effects described herein are not necessarily limited, and may be any of the effects described herein. Further, the content of the invention is not interpreted to be limited by the exemplified effects in the following description.

Figs. 1A and 1B A perspective view used for describing a disc tray.

Figure 2:
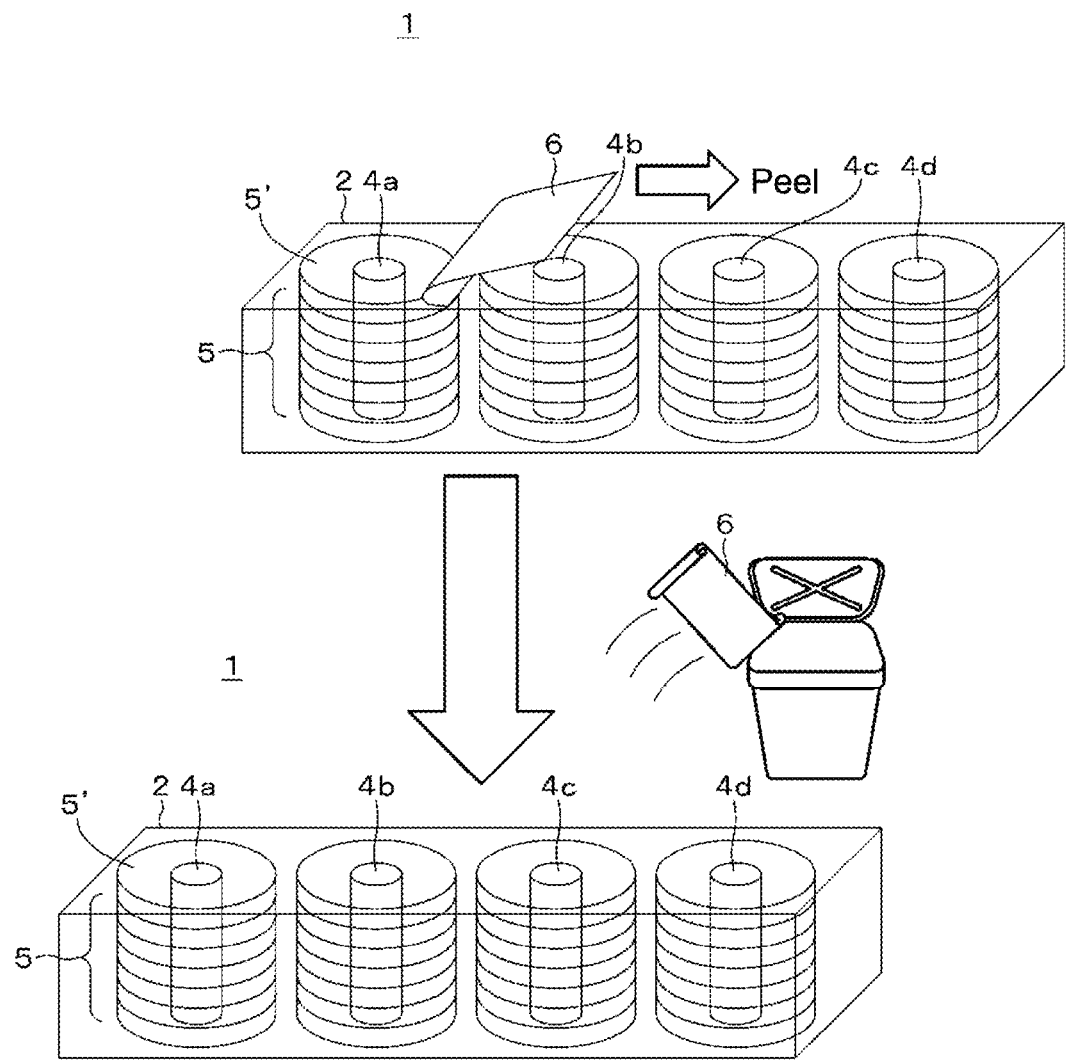

FIG. 2 A perspective view used for describing the disc tray.

Figure 3:
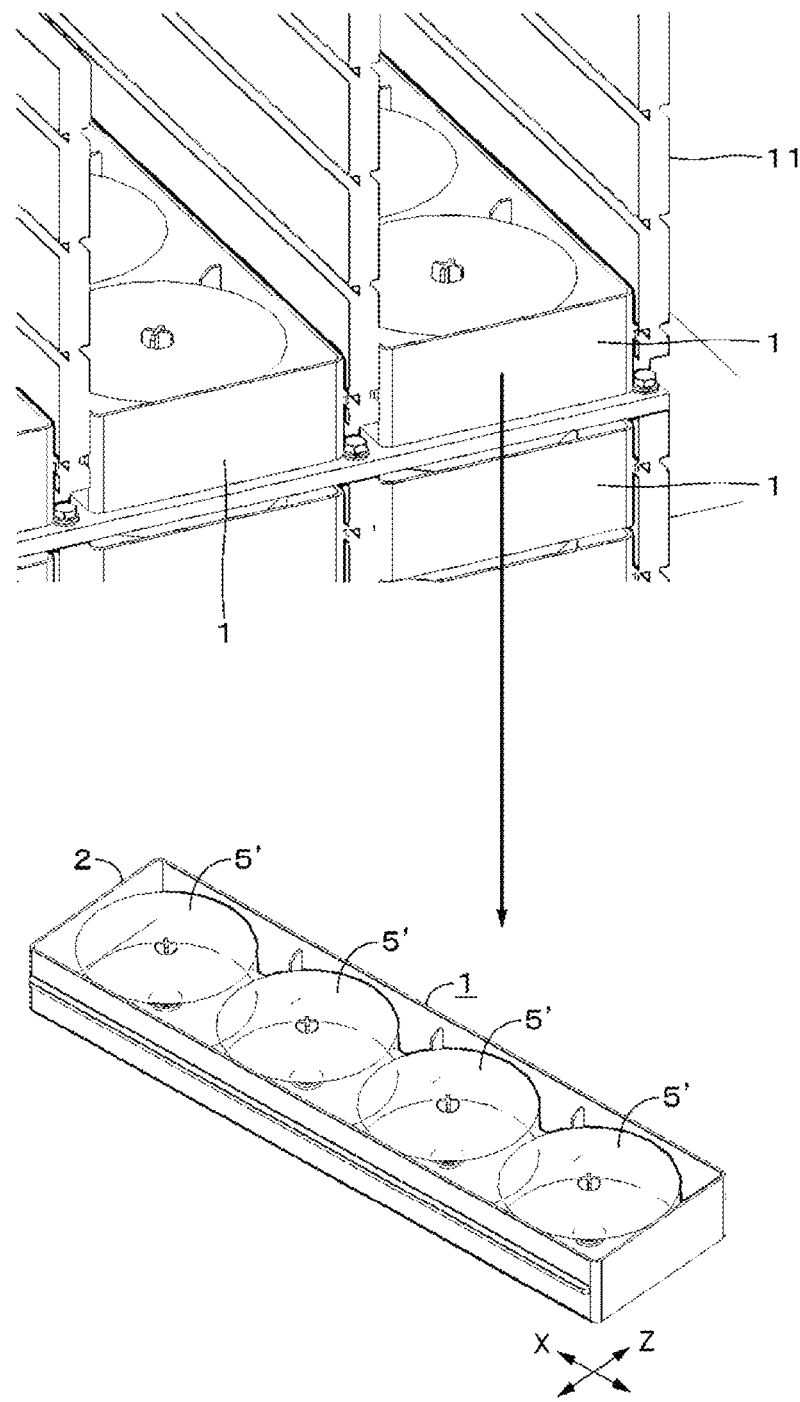

FIG. 3 A perspective view used for describing the disc tray and a disc tray rack.

Figure 4:
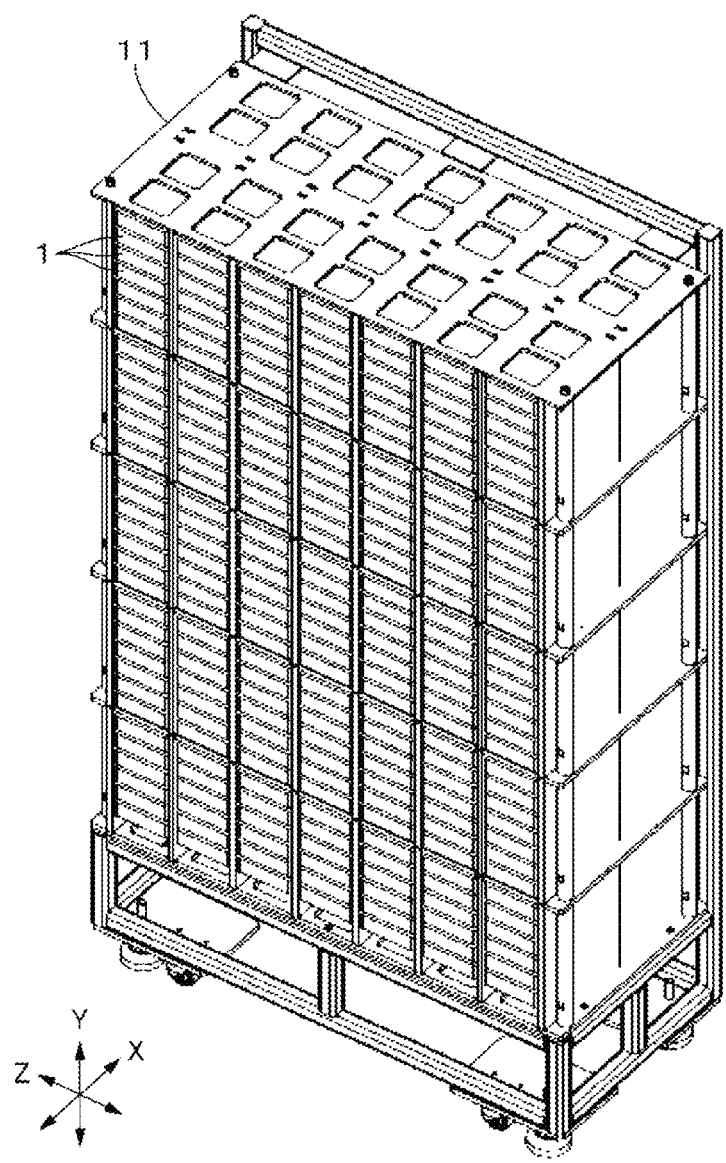

FIG. 4 A perspective view used for describing the disc tray rack.

Figure 5:
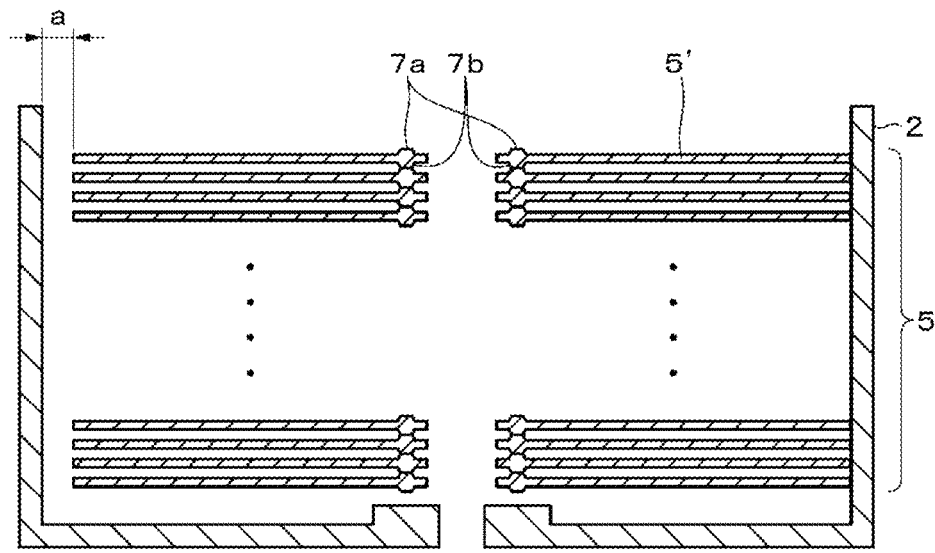

FIG. 5 A cross-sectional view of the disc tray.

Figure 6:
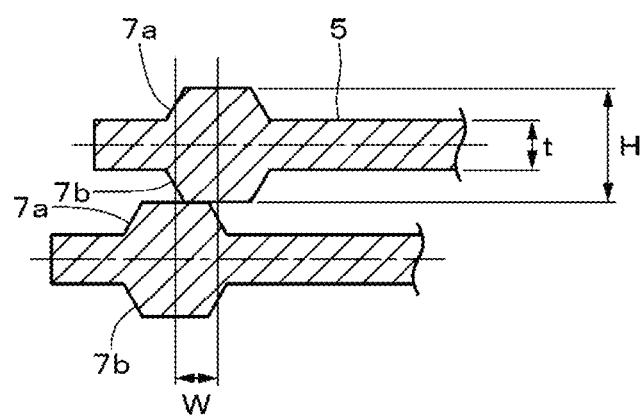

FIG. 6 A partial cross-sectional view used for describing a rib.

Figs. 7 A and 7B A partial cross-sectional view used for describing the rib.

Figure 8:
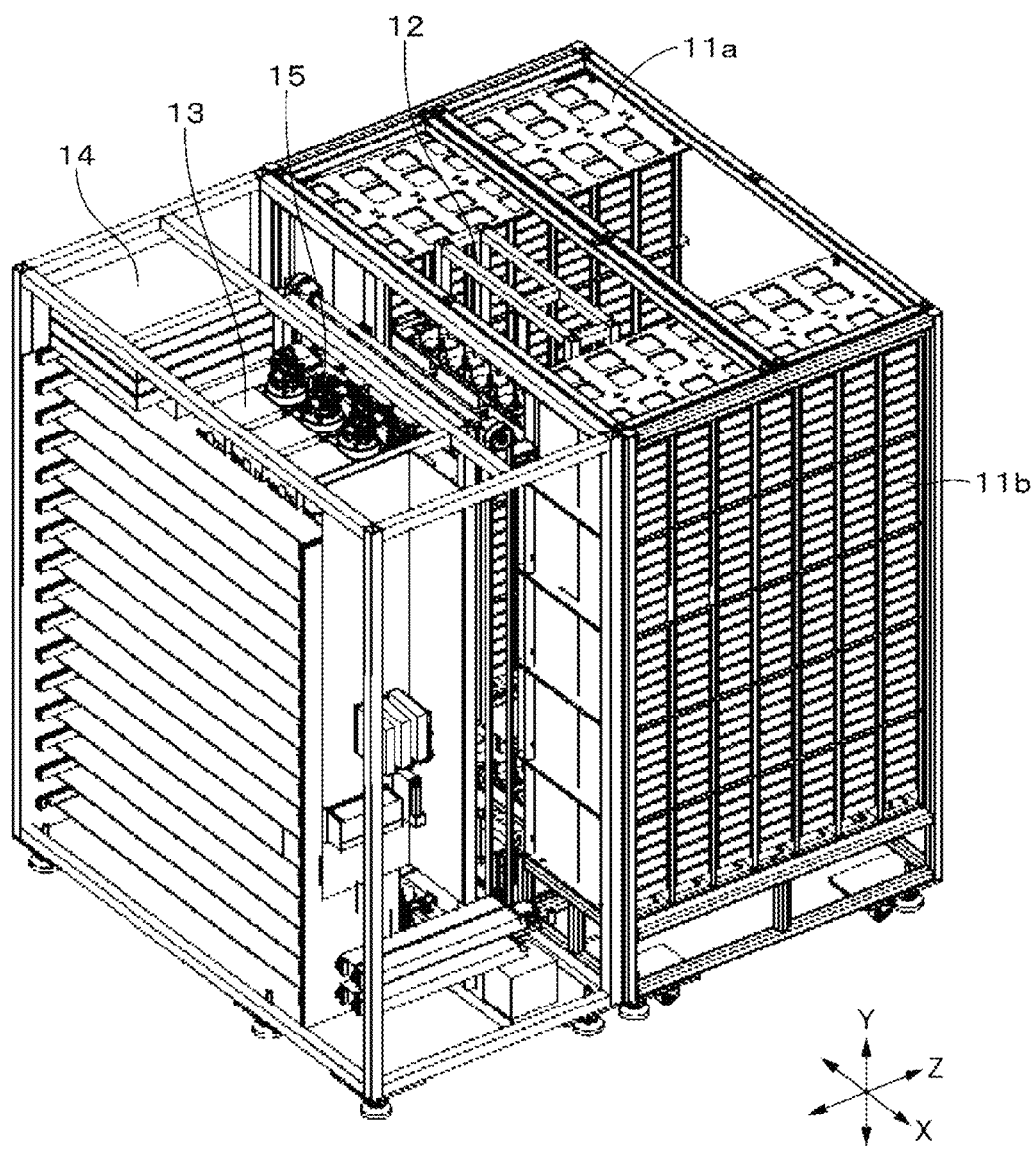

FIG. 8 A perspective view showing the entire disc archive apparatus.

Figure 9:
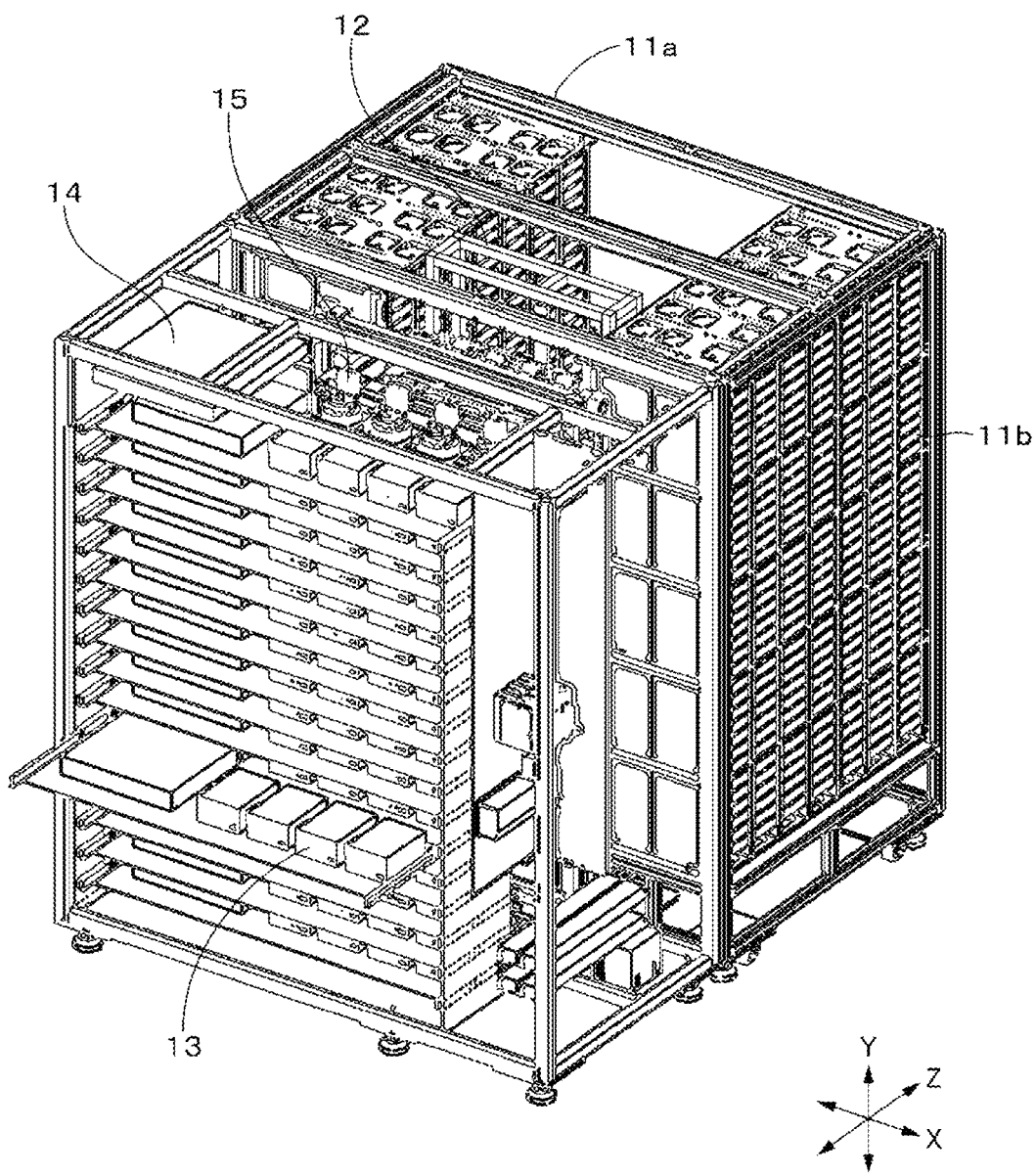

FIG. 9 A perspective view showing the entire disc archive apparatus.

Figure 10:
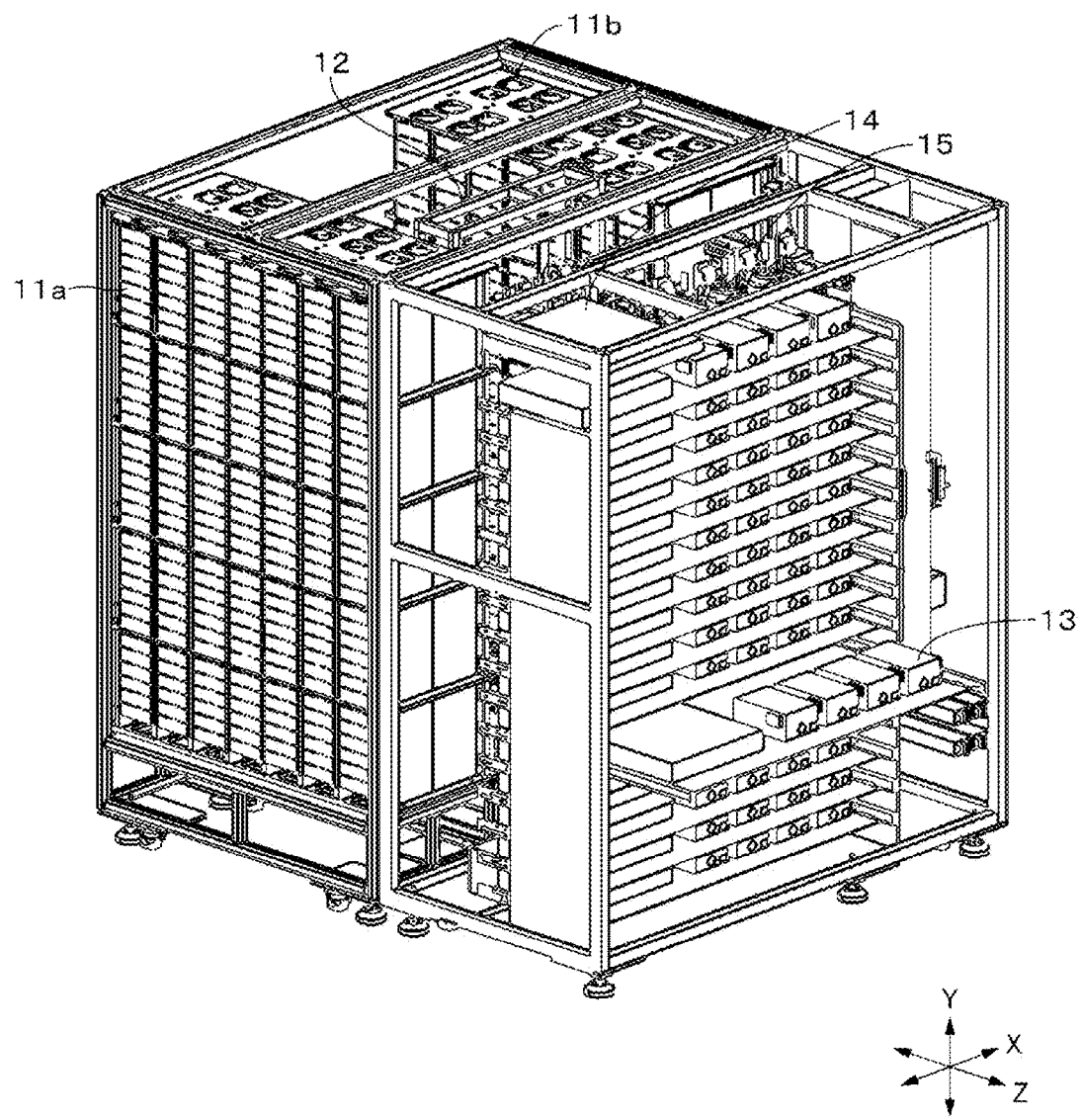

FIG. 10 A perspective view showing the entire disc archive apparatus.

Figure 11:
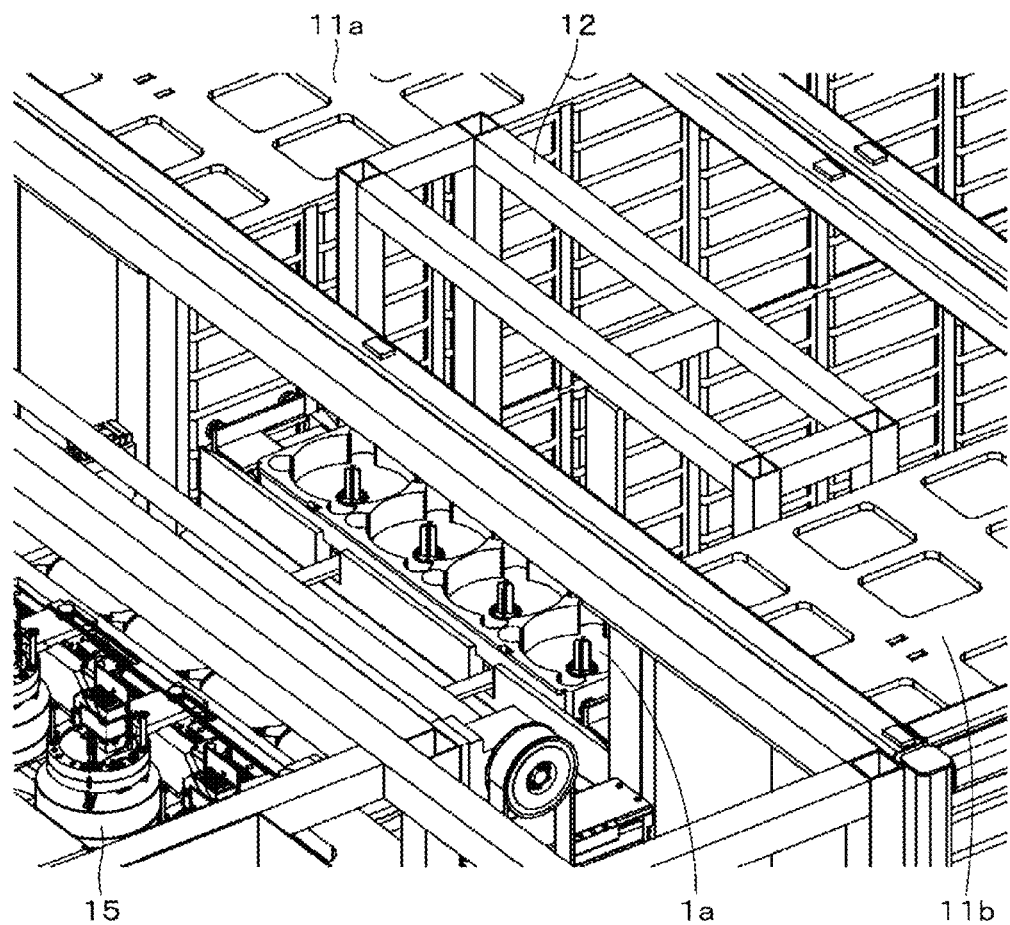

FIG. 11 A perspective view showing a part of the disc archive apparatus.

Figure 12:
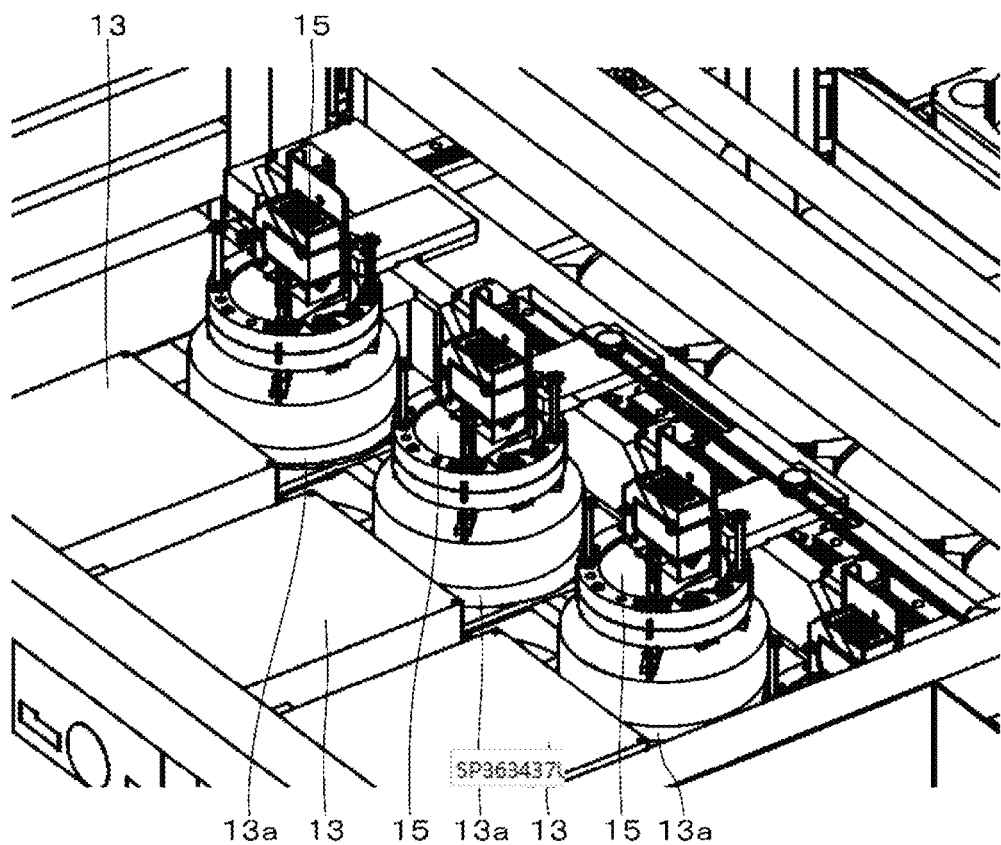

FIG. 12 A perspective view showing a part of the disc archive apparatus.

Figure 13:
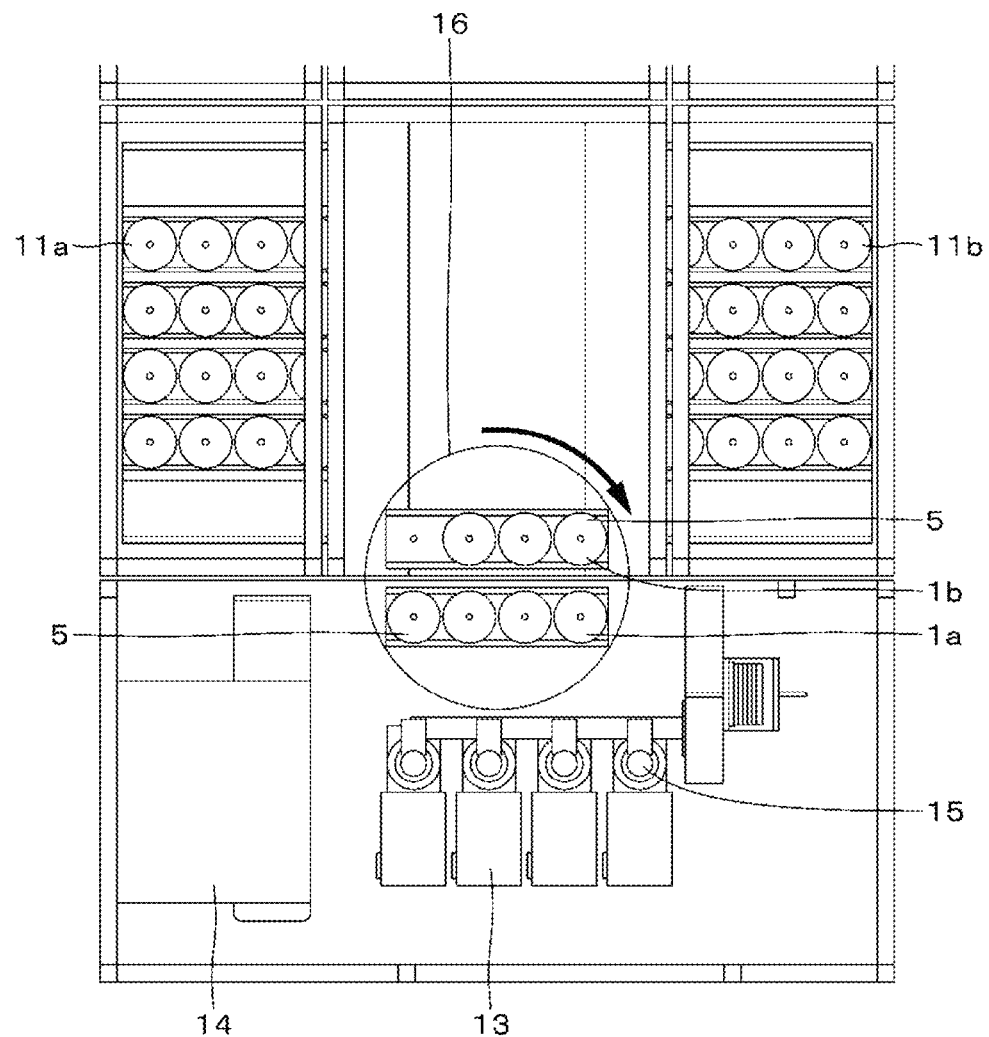

FIG. 13 A plan view of the disc archive apparatus.

Figure 14:
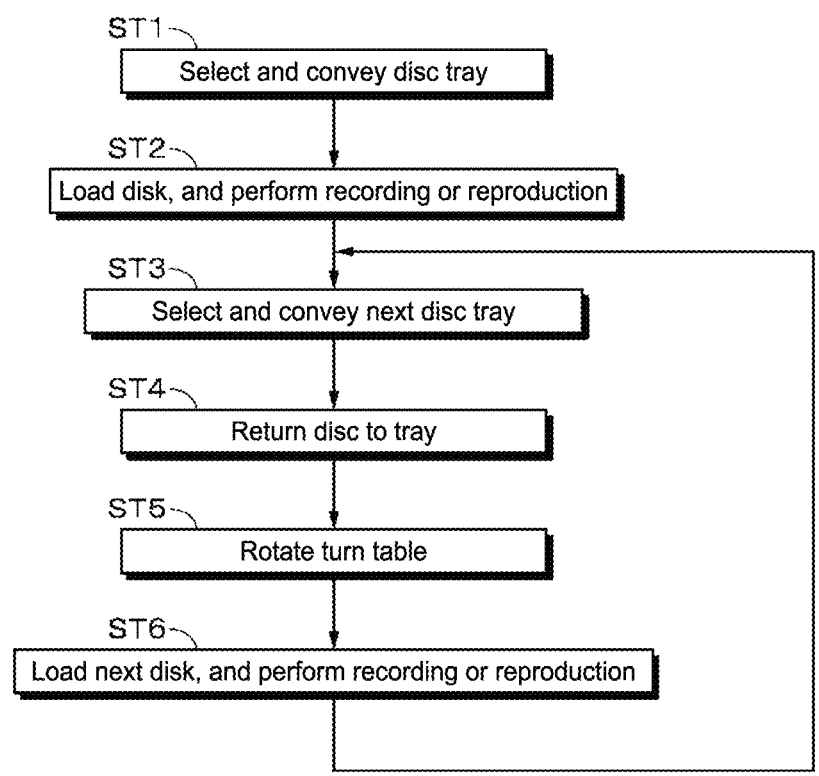

FIG. 14 A flowchart showing flow of processing of the disc archive apparatus.

Figure 15:
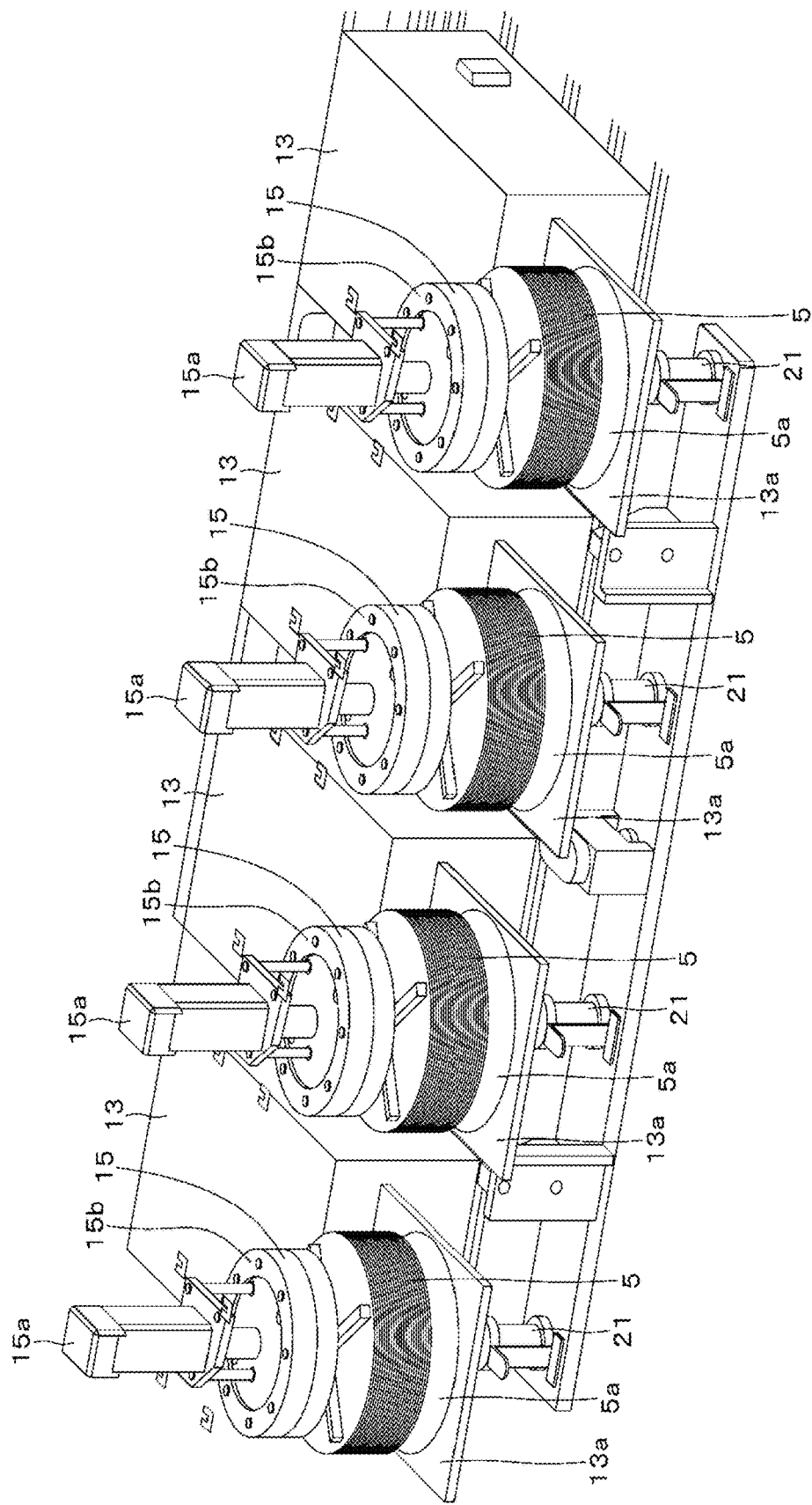

FIG. 15 A perspective view showing a part of the disc archive apparatus.

Figure 16:
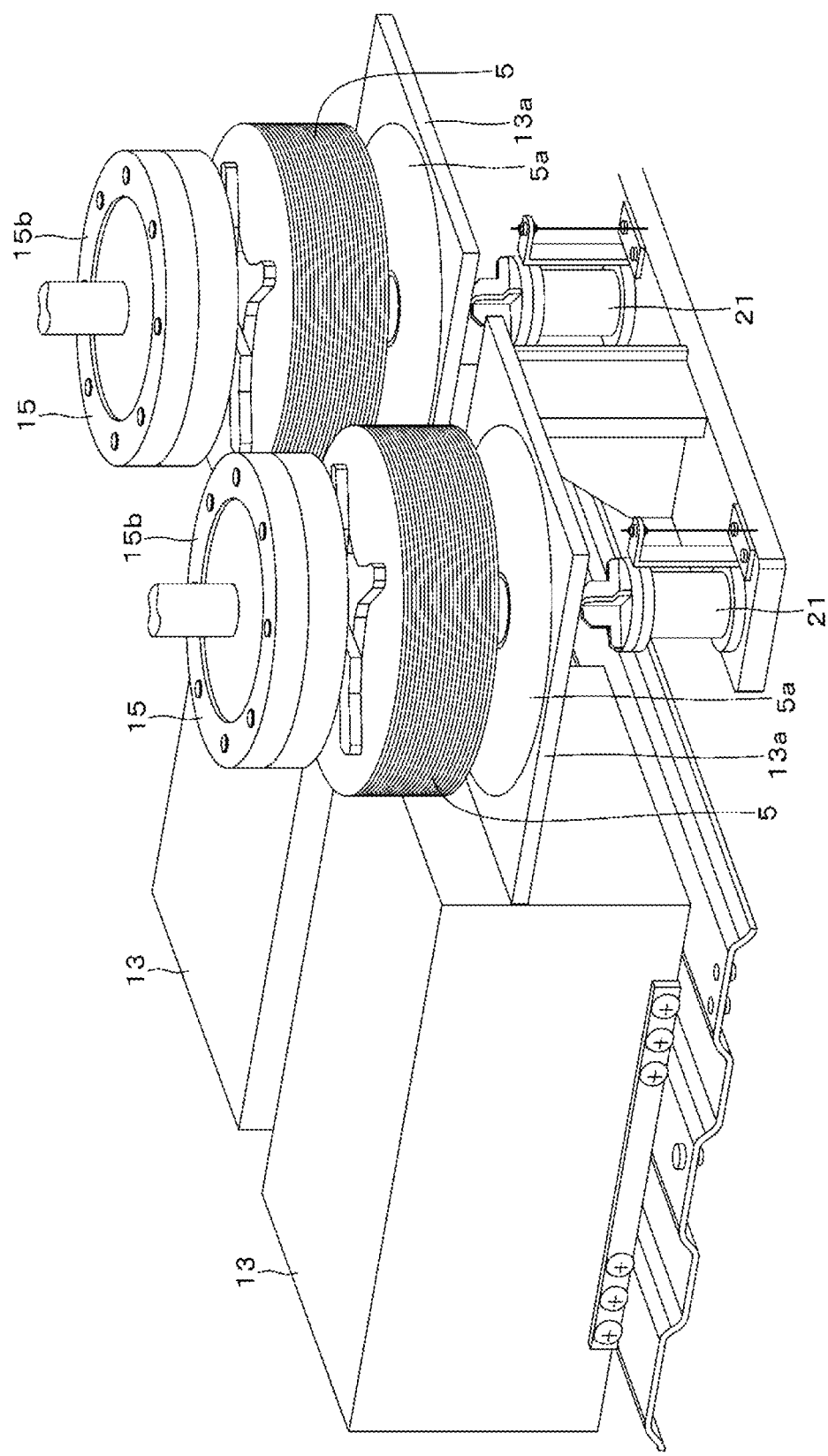

FIG. 16 A perspective view showing a part of the disc archive apparatus.

Figure 17A:
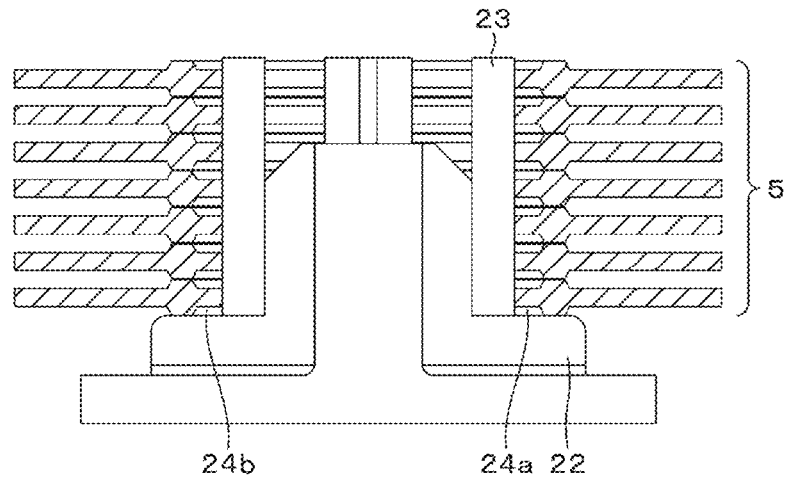
Figure 17B:
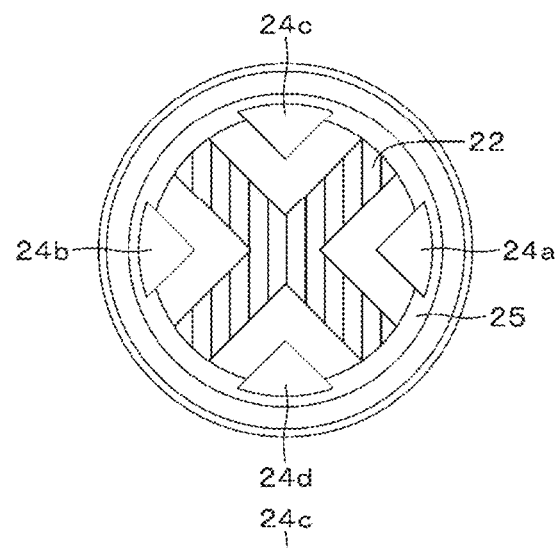
Figure 17C:
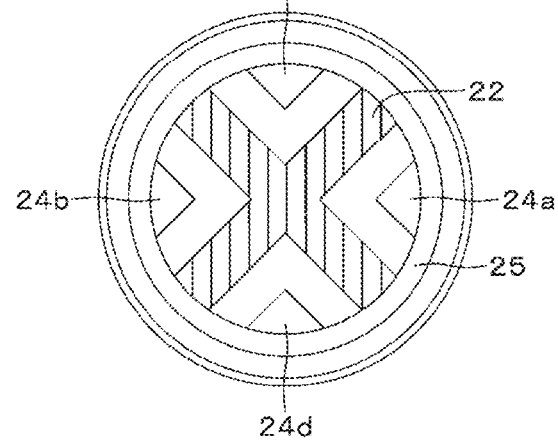

Figs. 17A, 17B, and 17C A cross-sectional view and a plan view used for describing a picker pusher.

Figure 18A:
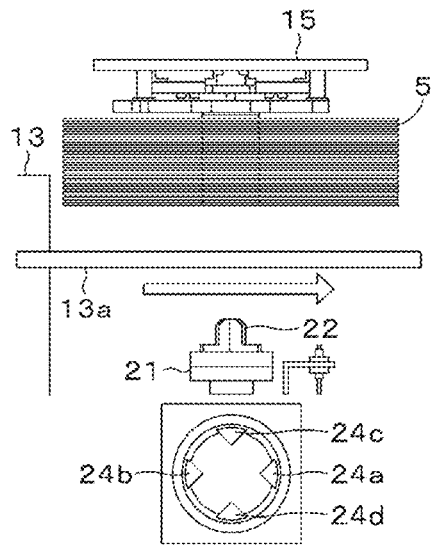
Figure 18B:
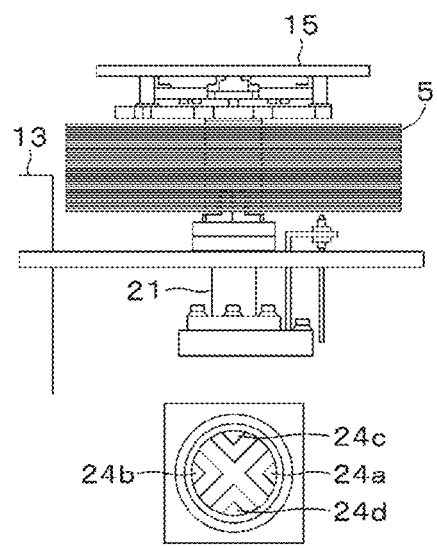
Figure 18C:
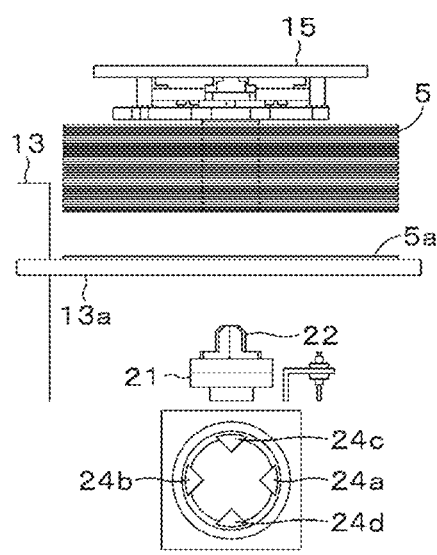

Figs. 18A, 18B, and 18C A schematic diagram used for describing an operation of the picker pusher.

Figs. 19A, 19B, 19C, and 19D A schematic diagram used for describing an operation of the picker pusher.

Figure 20A:
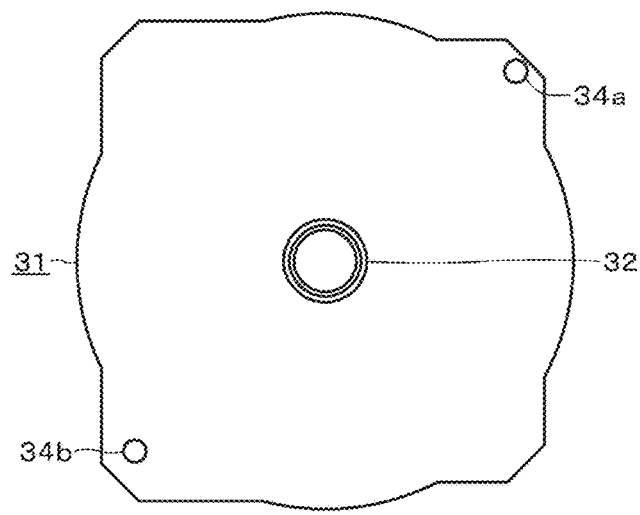
Figure 20B:
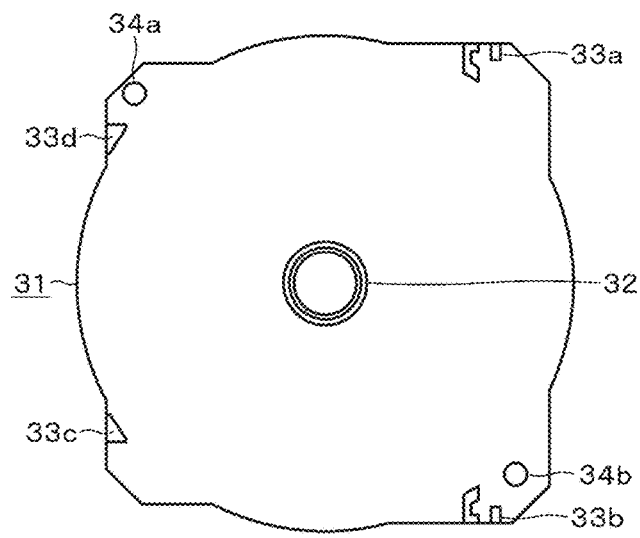
Figure 20C:
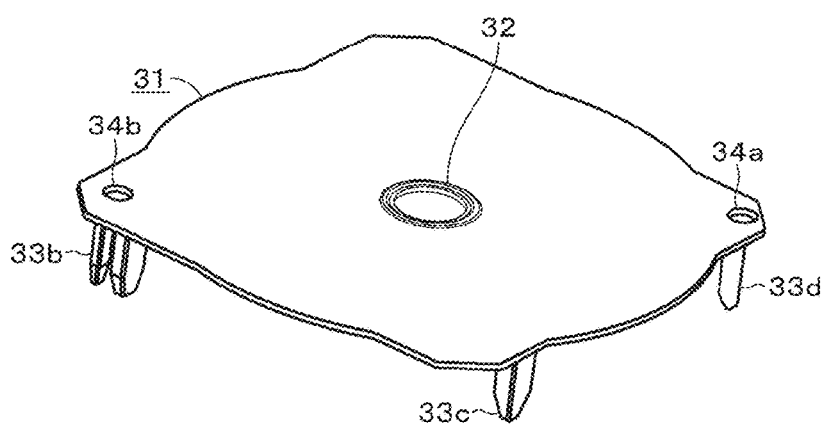

Figs. 20A, 20B, and 20C A plan view, a bottom view, and a perspective view of an example of a disc cover.

Figure 21:
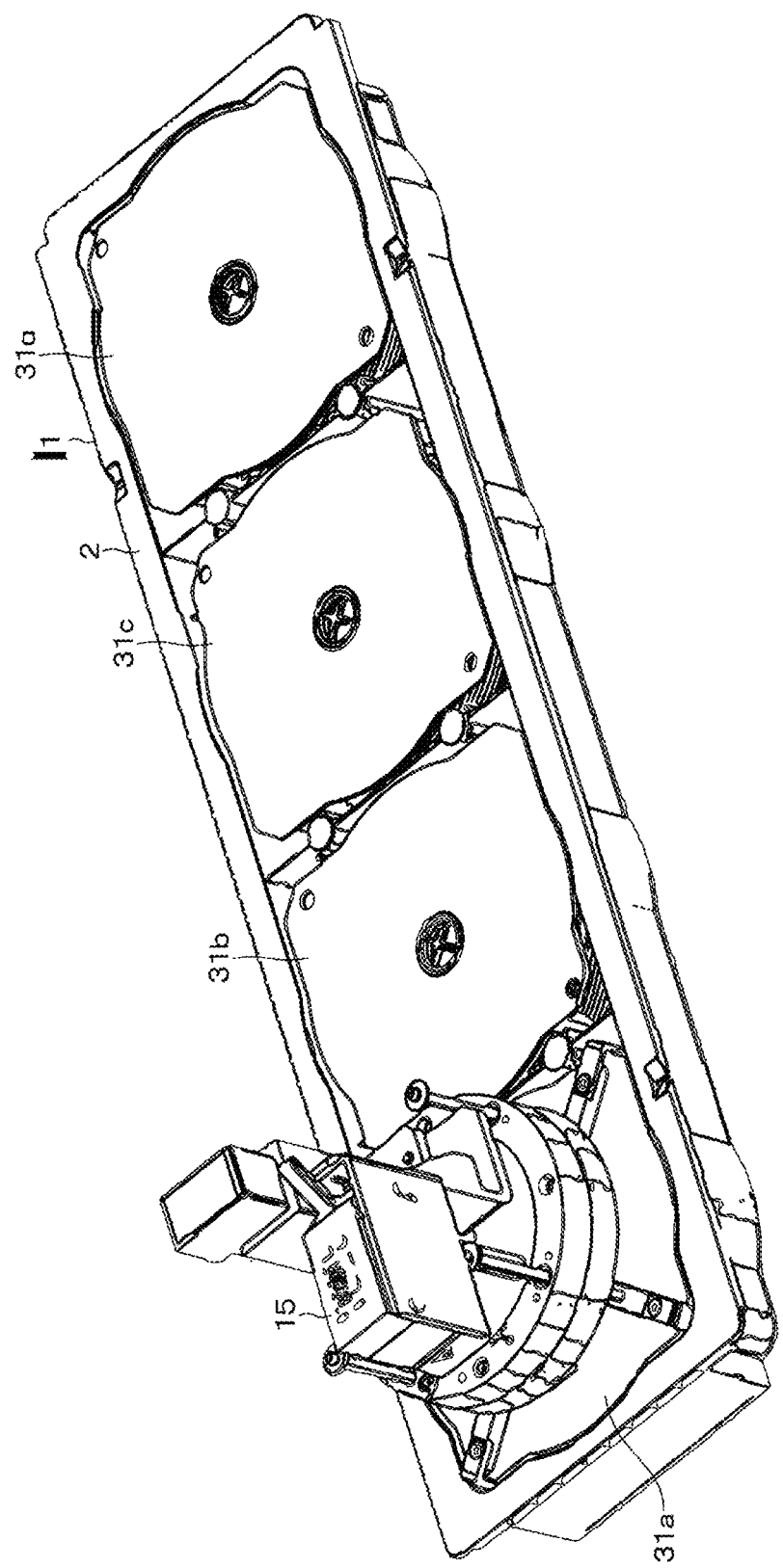

FIG. 21 A perspective view of the disc tray in the state where the disc cover is attached thereto.

Figure 22:
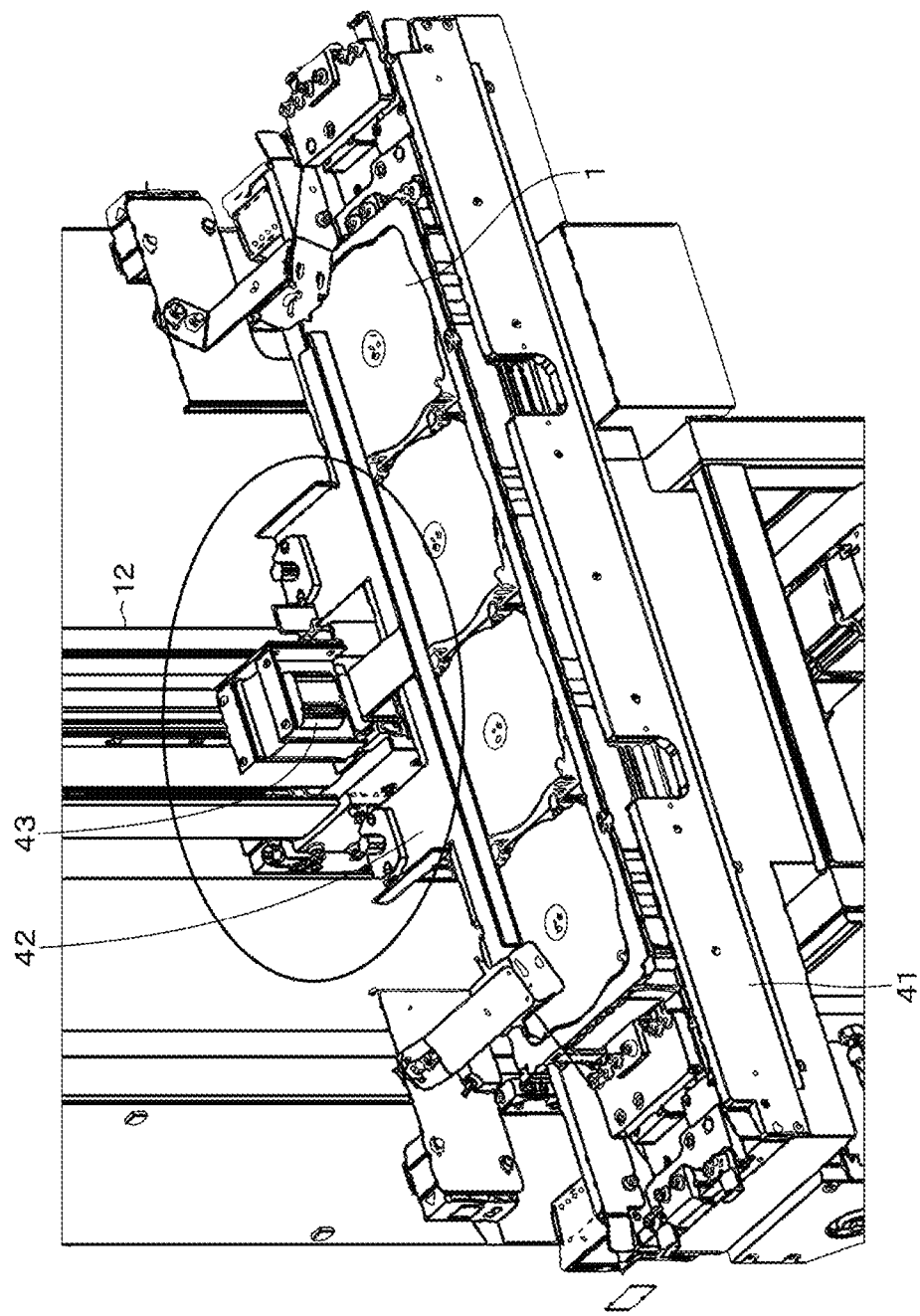

FIG. 22 A perspective view showing the state where a tray conveying robot supports the disc tray.

Figure 23:
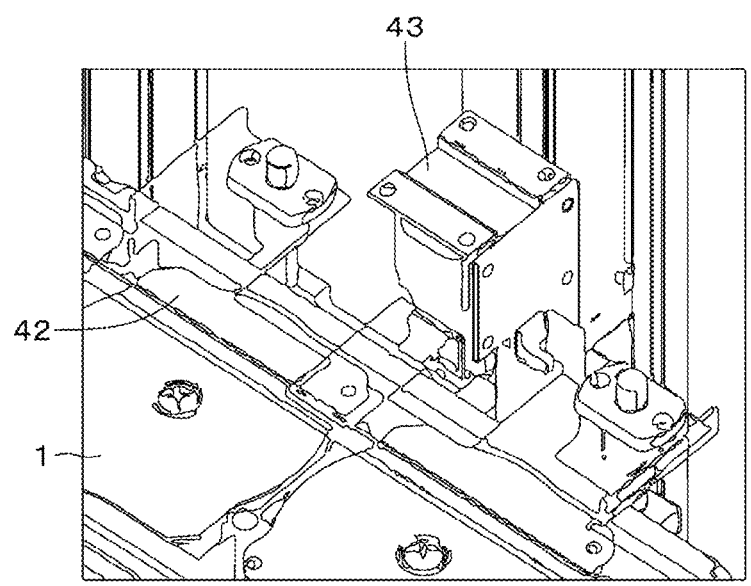

FIG. 23 A partially enlarged perspective view of FIG. 22.

Figure 24:
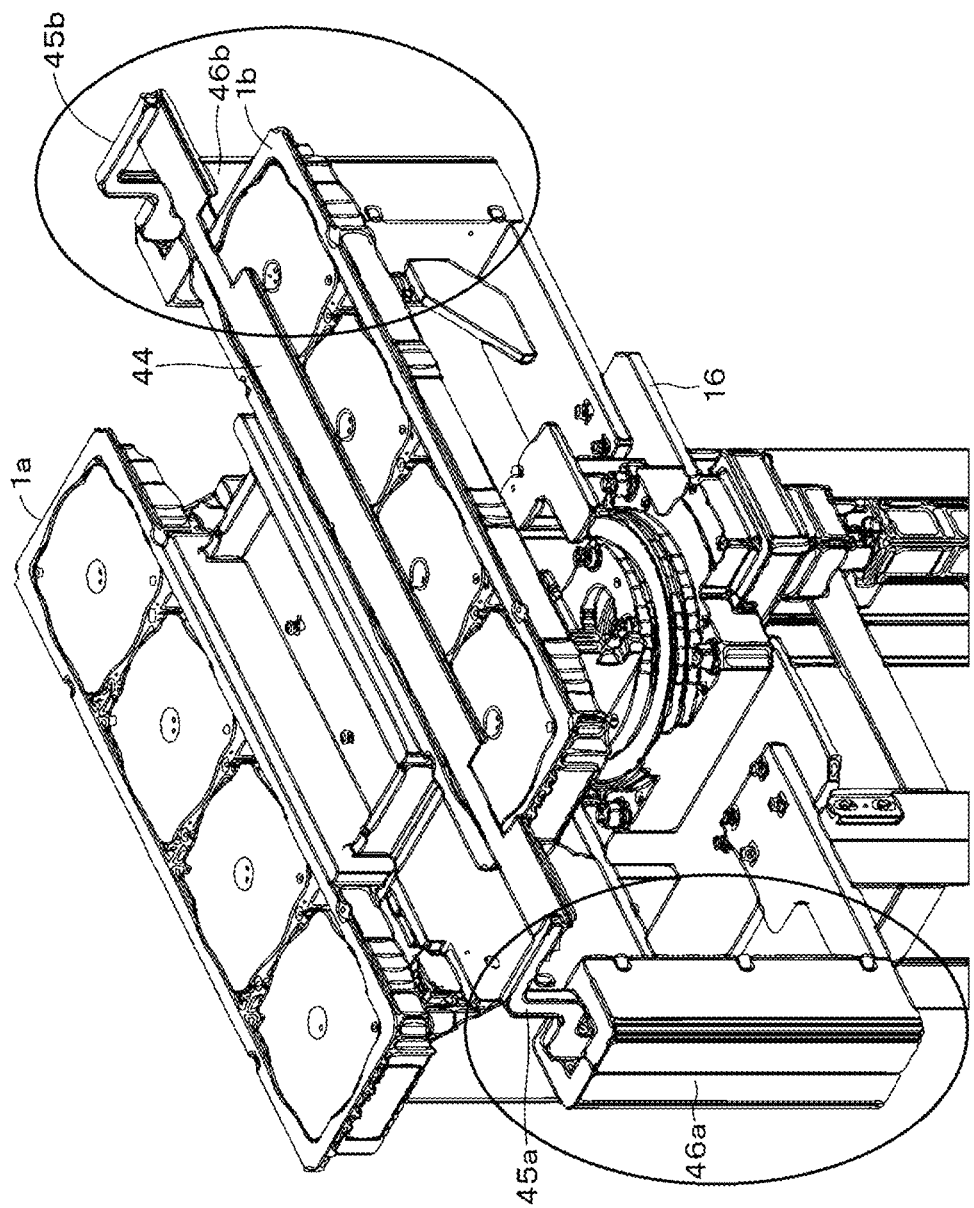

FIG. 24 A perspective view showing the state where a turn table supports the disc tray.

Figure 25:
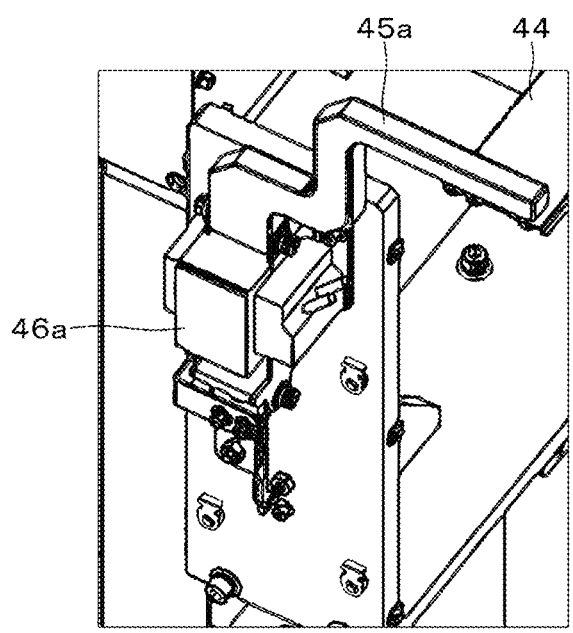

FIG. 25 A partially enlarged perspective view of FIG. 24.

Figure 26:
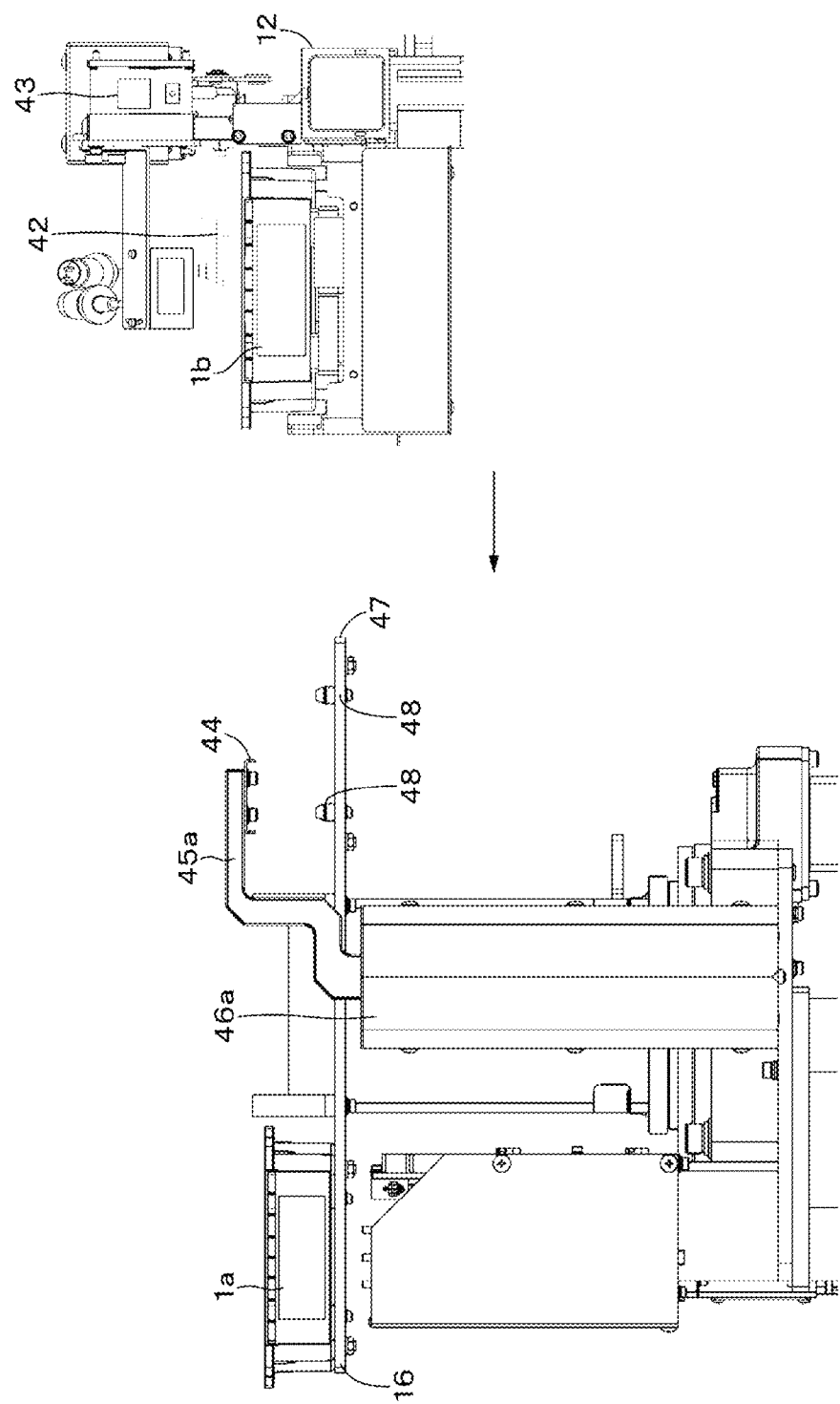

FIG. 26 A schematic diagram used for describing an operation in which the disc tray is delivered between the tray conveying robot and the turn table.

Figure 27:
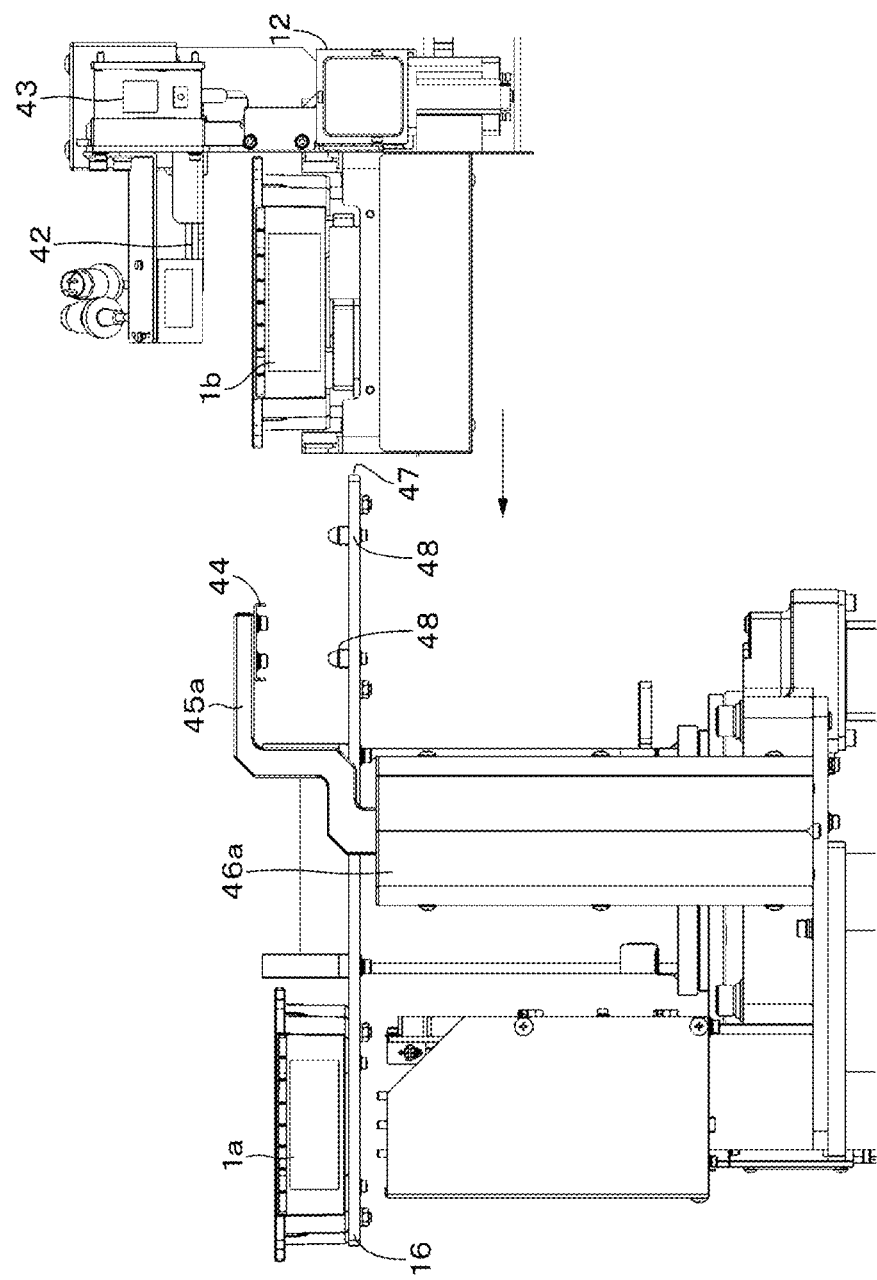

FIG. 27 A schematic diagram used for describing an operation in which the disc tray is delivered between the tray conveying robot and the turn table.

Figure 28:
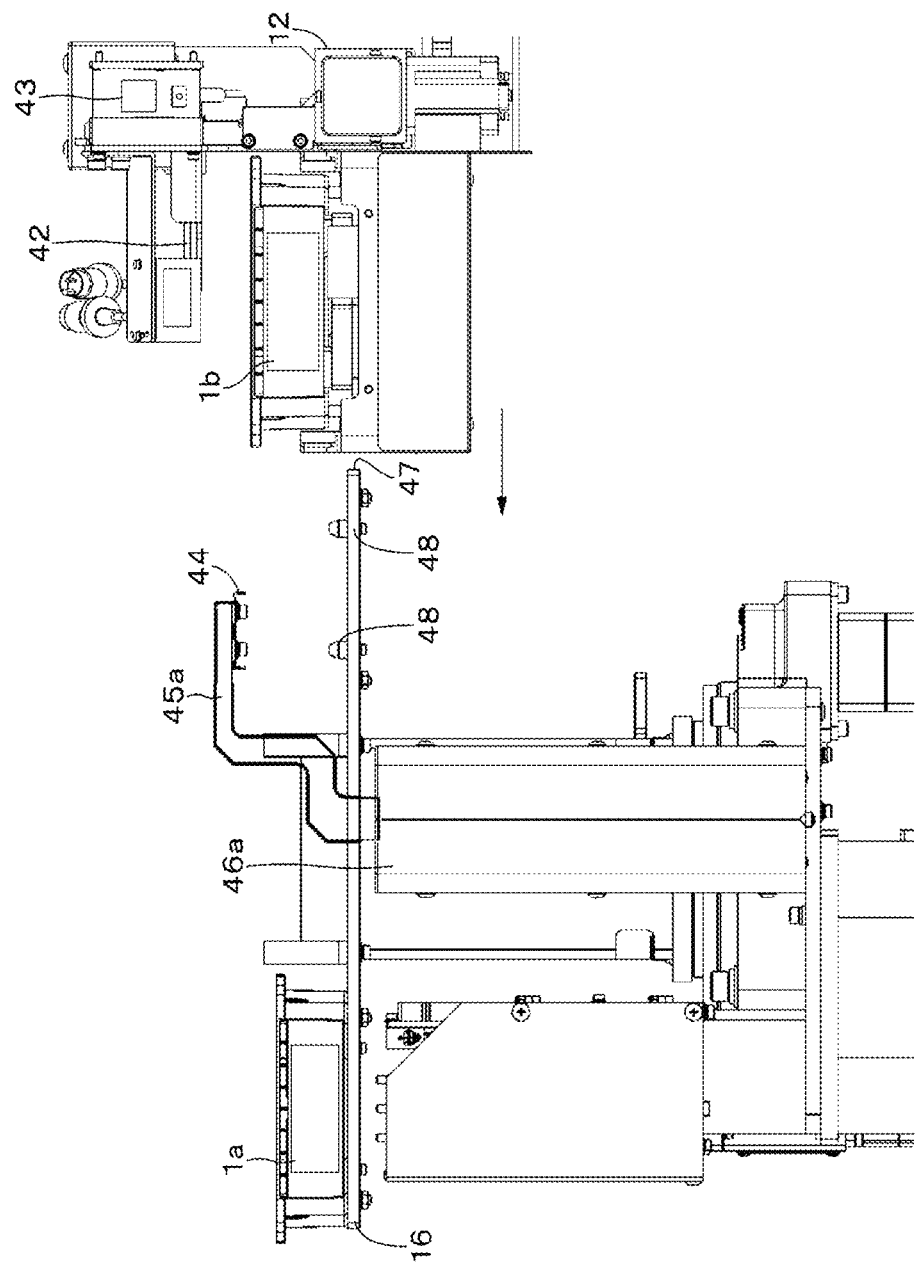

FIG. 28 A schematic diagram used for describing an operation in which the disc tray is delivered between the tray conveying robot and the turn table.

Figure 29:
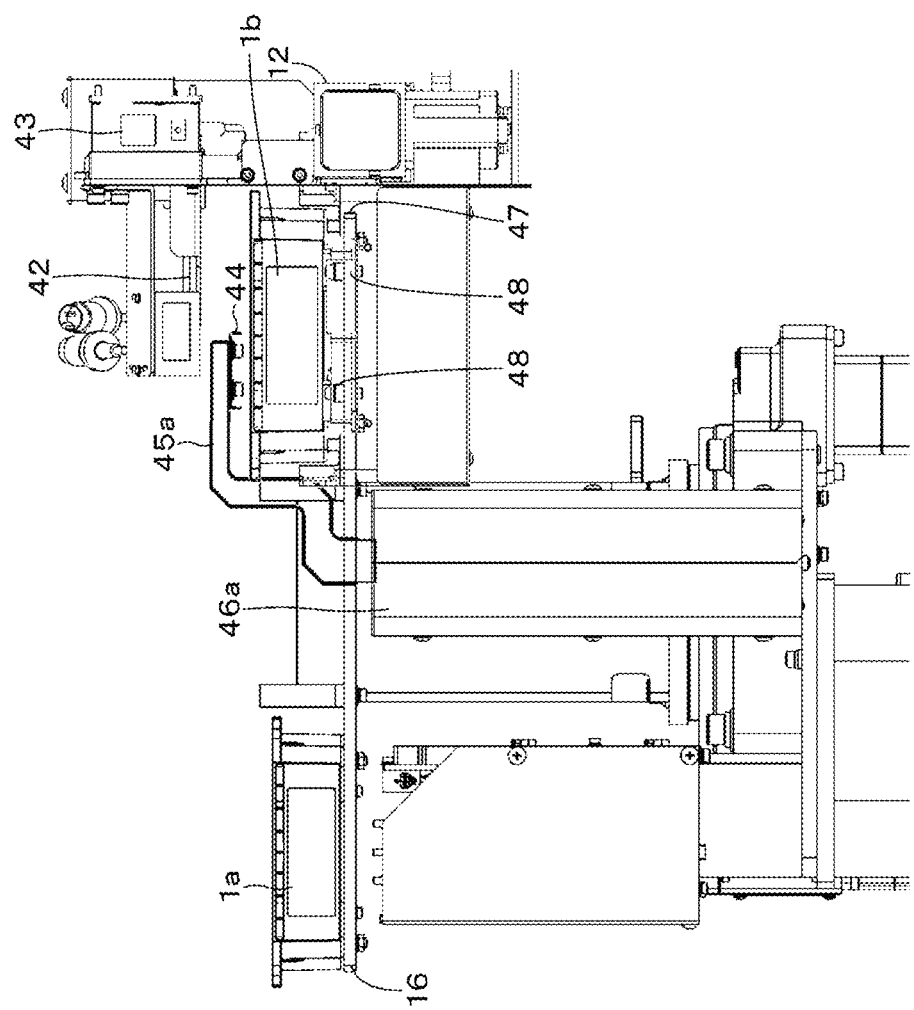

FIG. 29 A schematic diagram used for describing an operation in which the disc tray is delivered between the tray conveying robot and the turn table.

Figure 30:
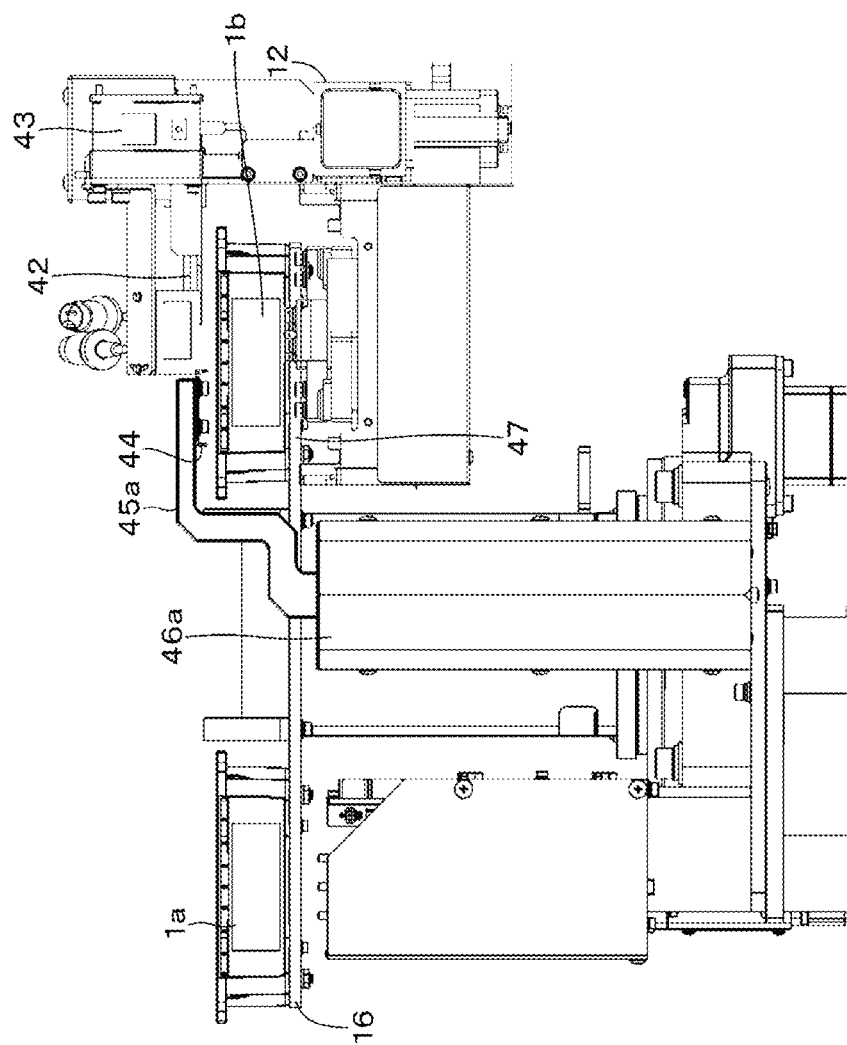

FIG. 30 A schematic diagram used for describing an operation in which the disc tray is delivered between the tray conveying robot and the turn table.

Figure 31:
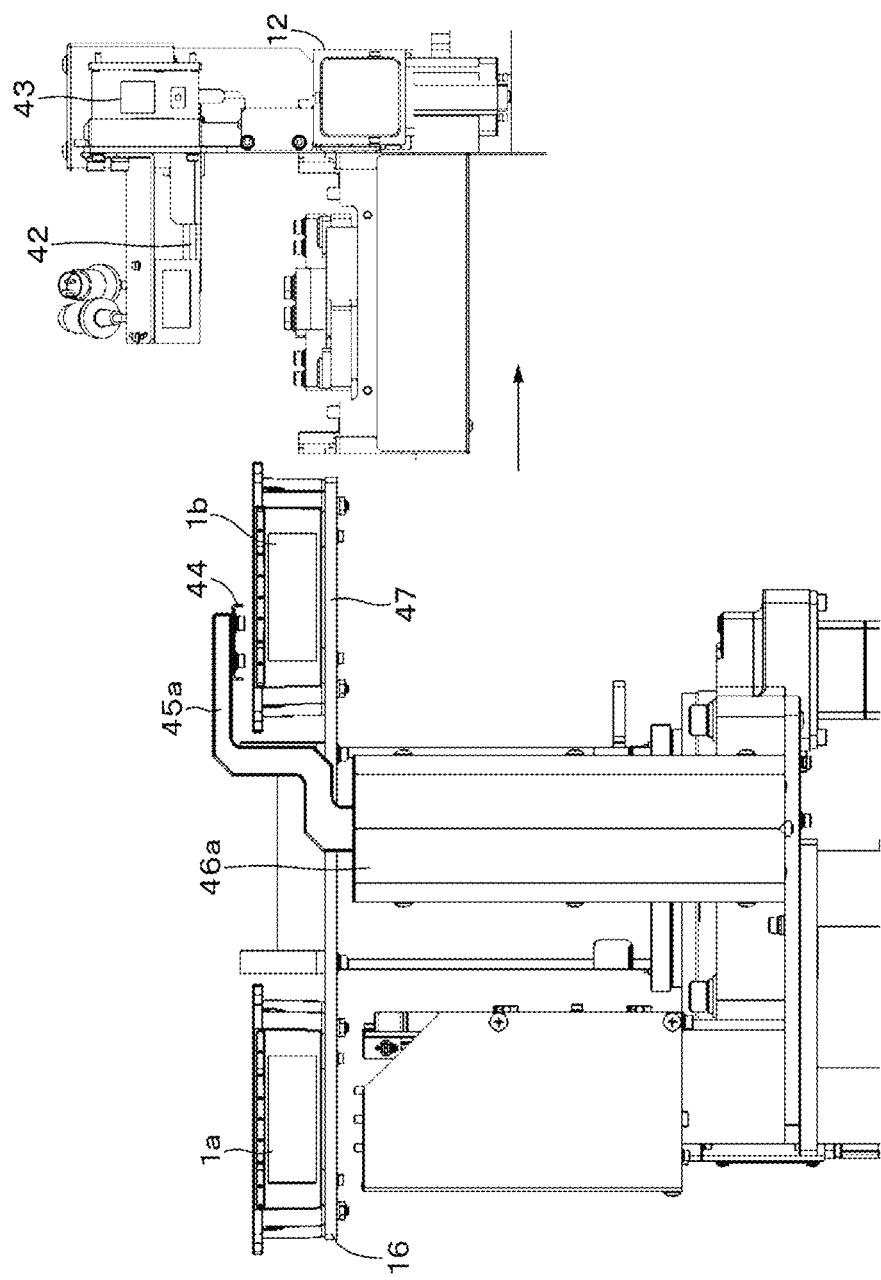

FIG. 31 A schematic diagram used for describing an operation in which the disc tray is delivered between the tray conveying robot and the turn table.

DESCRIPTION OF PREFERRED EMBODIMENTS

Embodiments to be described below are desirable specific examples of the present technology, and technically desirable various limitations are given. In the following description, however, the scope of the present technology is not limited to the embodiments unless description of limiting the present technology is made.

Note that description of the present technology will be made in the following order.
<1. Embodiment>
<2. Modified Example>
 <1 Embodiment>
 (Disc and Disc Tray)

An embodiment of the present technology is one using a high-capacity optical disc as a disc. For example, as the disc, a high-density optical disc such as a BD (Blu-ray (registered trademark) Disc) can be used. The BD is a high-density optical disc having a recording capacity of approximately 25 GB and approximately 50 GB, respectively, in the case where it is a single-sided/single-layer BD and single-sided/dual layer BD. In the BD standard, the light source wavelength is 405 nm, and the NA (Numerical Aperture) of the objective lens is large, i.e., 0.85, in order to reduce the beam spot diameter. Further, in recent years, a BDXL (registered trademark) in which the channel bit length, i.e., mark length is shortened and the density is increased in the line density direction as compared with the BD (Blu-ray (registered trademark) Disc), and a high capacity of 100 GB and 128 GB is obtained, respectively, in the case of three layers and four layers, is put into practical use. Further, in order to further increase the recording capacity, an optical disc that employs a method of recording data in both of groove tracks and land tracks (appropriately referred to land/groove recording method) has been proposed. In this case, a higher capacity can be obtained.

As an example, four housing concave portions 3a to 3d (referred to as the housing concave portion 3 when the housing concave portions do not need to be distinguished from each other) are formed to be aligned in a box-type synthetic resin enclosure 2 whose upper surface is opened as shown in FIGS. 1A and 1 B. The housing concave portions 3 have substantially the same shape as the outer shape of the disc, and center poles 4a to 4d (referred to as the center pole 4 when the center poles do not need to be distinguished from each other) are erected at the center. Specifically, N (e.g., N=4) columns of discs 5 are housed.

As shown in FIG. 2, M (e.g., M=16) discs 5 are stacked and housed in the housing concave portion 3 (each column), and a dummy disc 5' is stacked at the top of the M discs 5. The center pole 4 passes through the central opening of the disc. Further, after the discs 5 are housed, the upper opening of the enclosure 2 is covered by a transparent or semi-transparent resin film 6. The disc container sealed by the film 6, in which the disks are housed, as described above, is referred to as the disc tray 1. It should be noted that the film 6 is peeled off from the enclosure 2 for use, and thrown away. By sealing the opening with the film 6, it is possible to prevent dust from attaching to the disc 5 and assure that it is an unused disc. Further, in the case where the film 6 leaves traces when it is replaced, it is possible to improve the security. Further, even after the film 6 is peeled off, since the dummy disc 5' is placed on the top of the stacked discs 5, floating dust is prevented from attaching to the disc 5 for storing data. Note that the dummy disc 5' has substantially the same shape as that of the disc 5. Note that because the dummy disc 5' may pop out from the enclosure 2 by vibration, the upper portion of the stacked discs 5 is favorably covered by a disc cover including a leg portion that is engaged with a part of the enclosure 2, as will be described later.

The disc tray 1 from which the film 6 is peeled off is placed on each shelf of a disc tray rack 11 as shown in FIG. 3. The length direction of the disc tray 1 is an X direction, and the width direction of the disc tray 1 is a Z direction. As an example, the disc tray rack 11 has a depth dimension slightly larger than the length of the disc tray 1 and a width in which 7 disc trays 1 can be arranged sideways and housed as shown in FIG. 4.

The disc tray rack 11 includes 5 shelves, and the disc trays 1 are placed on the shelfs. Six disc trays 1 are placed on the bottom shelf in the Y direction, and 7 sets of 6 disc trays 1 are arranged in the Z direction. That is, up to 42 disc trays 1 are housed. On the other shelves, 7 sets of 7 disc trays 1 are arranged in the Z direction, i.e., up to 49 disc trays 1 are housed. Therefore, in one disc tray rack 11, up to 91 (=42+49) disc trays 1 can be housed.

The front surface of the disc tray rack 11 is opened to freely take out the disc tray 1, and a door is provided to the back surface of the disc tray rack 11. As will be described later, a conveying robot moves in front of the disc tray rack 11 in the Z direction to take out a target disc tray 1. Further, from the back surface of the disc tray rack 11, a worker can place the disc tray 1 in the disc tray rack 11.

FIG. 5 schematically shows the cross-section of the disc tray 1 in the Z direction. The discs 5 are stacked and housed in the enclosure 2, and the dummy disc 5' is placed on the top thereof. When the discs 5 and the dummy disc 5' are stacked as described above, a problem in which the discs stick together occurs. In this embodiment, ribs 7a and 7b are provided in the vicinity of the central opening of the disc 5 and the dummy disc disc 5' so that the disc 5 and the dummy disc 5' are prevented from sticking together. Note that although description will be made regarding the disc 5 in the following description, the same shall apply to the dummy disc 5'.

That is, as shown in FIG. 6, the rib 7a is formed on one side (A side) of the disc 5, and the rib 7b is formed on the other side (B side) of the disc 5. The ribs 7a and 7b are formed on the respective surfaces at the same position, and have the same shape. The ribs 7a and 7b are formed on the clamping area in the vicinity of the central opening of the disc 5 to have a circular shape that surrounds the opening.

In FIG. 6, t represents the thickness of the disc 5, and H represents the thickness at the position at which the ribs 7a and 7b are formed. Further, because it is difficult to form the housing concave portion 3 of the enclosure 2 to have exactly the same shape as the outer shape of the disc 5, the shape of the housing concave portion 3 is larger than the outer shape of the disc 5. As shown in FIG. 5, there is a space having a width a between the outer edge of the disc 5 and the inner surface of the housing concave portion 3. Because of the width a, an eccentricity W of the upper and lower discs in the enclosure 2 occurs. Further, the shape of the disc 5 is changed by, for example, a change in ambient temperature. As a result, the eccentricity W may occur.

Even if the eccentricity W occurs, there is a space between the upper and lower discs 5 when the ribs 7b and 7a of the upper and lower discs 5 are in contact with each other as shown in FIG. 6, and thus, it is possible to prevent the upper and lower discs from sticking together. Although the dimensions of the disc 5 are defined by the standards, a certain allowable range has been set. As an example, the maximum value of a is 1.5 mm, the eccentricity W is (0 to 1.5 mm), t is (1.10 to 1.30 mm), and H is (1.6 to 2.0 mm).

Figure 7A:
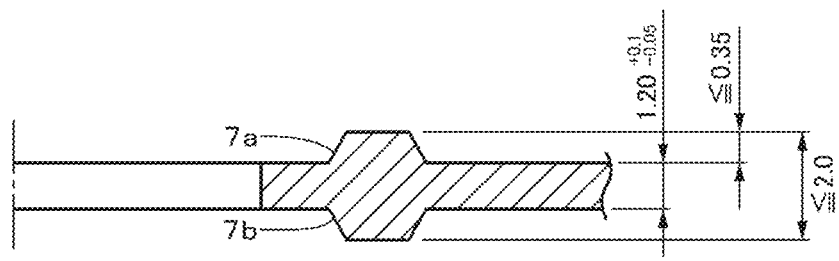
Figure 7B:
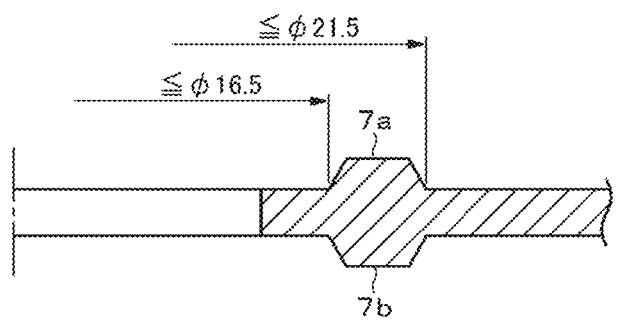

Therefore, as shown in FIG. 7A, because the maximum value of the thickness H at the position at which the ribs 7a and 7b are formed is 2.0 mm and the maximum value of the thickness t of the disc 5 is 1.30 mm, the maximum value of the height of the ribs 7a and 7b is 0.35 mm. Further, the ribs 7a and 7b are formed at the position of the innermost circumference of the clamping area. As an example, as shown in FIG. 7B, the ribs 7a and 7b are formed at the position within the range of 16.5mm to 21.5 mm from the center of the disc. These values represent that even if the eccentricity W having the maximum value of 1.5 mm occurs, a gap can be formed between the upper and lower discs 5, thereby preventing the discs from sticking together.

(Entire Archive Apparatus)

FIG. 8, FIG. 9, and FIG. 10 are each a perspective view showing the appearance of the entire system of the disc archive apparatus of the present technology. The system mainly includes disc tray racks 11a and 11b, a tray conveying robot 12, a disc drive 13, a controller that controls the entire system, an electrical circuit portion 14 that includes a power supply circuit and the like, a disc conveying picker 15, and a turn table 16. The configuration including one disc tray rack 11 is the minimum configuration. By connecting the disc tray racks 11 to each other in the Z direction, it is possible to increase the number of disc tray racks 11.

A space is formed between the facing disc tray rack 11a and 11b. In the space, the tray conveying robot 12 runs. The tray conveying robot 12 is guided by, for example, the lower trolley line or lower rail, and runs by a driving source such as an electric motor. The tray conveying robot 12 is capable of stopping at a desired position with a position sensor. Further, the tray conveying robot 12 includes a barcode reader that is capable of reading a barcode displayed on the surface of the enclosure 2 of the disc tray 1, takes out the specified disc tray 1 from the disc tray rack 11a or 11b, and conveys it to the vicinity of the disc conveying picker 15.

The disc conveying picker 15 and the turn table 16 are provided to deliver discs between the tray conveying robot 12 and the disc drive 13. FIG. 11 shows an enlarged portion of the disc tray 1 on the tray conveying robot 12 and the disc conveying picker 15. FIG. 12 shows an enlarged portion of the disc conveying picker 15. FIG. 13 shows the turn table 16.

As shown by an arrow in FIG. 13, the turn table 16 is rotatable, and a first area and a second area on which two disc trays 1a and 1b are placed are set on the turn table 16. The turn table is divided into two portions with the diameter thereof as a boundary, and thus, the turn table includes the first area and the second area in a semicircular shape. The disc trays 1a and 1b can be placed on the first area and the second area.

By half-rotation of the turn table 16 from the position shown in FIG. 13, positions of the disc tray 1a and the disc tray 1b are switched. Then, the disc conveying picker 15 takes out all discs 5 from the disc tray 1a on the turn table 16, which is close to the disc drive 13.

The disc drive 13 is an apparatus that records or reproduces information on/from the disc 5. The disc 5 is placed on an opened drive tray 13a of the main body of the disc drive 13, the drive tray 13a is closed inside the main body, and the disc 5 is placed on a turn table, which is rotated by a spindle motor. Then, data is reproduced or recorded from/on the disc 5 by an optical pickup. The disc drive 13 includes a plurality of disc drives, and 16 sets of 4 disc drives arranged in the X direction are arranged in the Y direction. That is, the disc drives 13 are capable of simultaneously recording or reproducing up to 64 discs 5 housed in one disc tray.

The disc conveying picker 15 moves to above the case opening of the disc tray 1a, takes out all discs 5 (4 columns×17 (including one dummy disc)) housed in one disc tray 1a from the case, and houses them. The disc conveying picker 15 conveys the taken-out discs 5 to the position right above respective four opened trays of the disc drives 13 arranged at a first stage. Because the interval between four discs 5 in the disc tray 1a is different from that between drive axes of the four drives, the disc conveying picker 15 adjusts, e.g., increases the interval between the taken-out four discs 5, and then conveys them to right above the trays.

In the case where the disc 5 is loaded into the disc drive 13, the respective drive trays 13a of four drives of the disc drives 13 located at the bottom are opened, the disc conveying picker 15 conveys the stacked disc 5 to right above the drive tray 13a. Then, one bottom disc 5 of the discs 5 held by the disc conveying picker 15 is separated, and the separated disc 5 is placed on the drive tray 13a. The drive tray 13a is closed, and thus, the placed disc is loaded into the drive.

Next, the disc conveying picker 15 moves up (Y direction) and the drive trays 13a of four drives of the disc drives 13 located at the second from the bottom are opened. The disc 5 located at the second from the bottom is separated from the discs 5 held by the disc conveying picker 15, and placed on this drive tray 13a. The drive tray 13a is closed, and thus, the placed disc is loaded into the drive.

After that, the similar operation will be repeated. The top disk of the held discs is placed on the opened tray of the top drive, the tray is closed, and thus, the placed disc is loaded into the drive. In this way, (4 columns×16 disc 5 housed in one disc tray are loaded into (4 columns×16 ) drives of the disc drives 13.

Under the control of the controller that controls the system, when processing including recording or reproduction on the discs taken out from the disc tray 1a currently placed on the first area of the turn table 16 is finished, the turn table 16 is half-rotated and processing including recording or reproduction is performed on the discs of the next disc tray 1b placed on the second area of the turn table 16.

Further, under the control of the controller, while processing including recording or reproduction is performed on the discs taken out from the disc tray 1a currently placed on the first area of the turn table 16, the tray conveying robot 12 selects the next disc tray 1b and the selected next disc tray 1b is placed on the second area of the turn table 16.

That is, it is possible to place the next disc tray 1b to be used on the opposite surface of the turn table 16 and prepare for switching from the disc tray 1a to the disc tray 1b while information is recorded or reproduced on/from the discs 5 of the disc tray 1a That is, when recording or reproduction in/on the discs 5 housed in the disc tray 1a is finished, the disc conveying pickers 15 unload (4 columns×16 ) discs 5 from the disc drives 13. Contrary to the case of loading, unloading is started from the top four drives. Then, the unloaded discs 5 are returned to the disc tray 1a, and then, the disc tray 1a is placed on the turn table 16. Next, the turn table 16 is half-rotated, and the discs 5 in the disc tray 1b are loaded into the respective drives of the disc drives 13 by the disc conveying picker 15.

(Switching Operation of Disc Tray)

With reference to FIG. 14, a switching operation of the disc tray will be schematically described. Assumption is made that the disc tray is not placed on the turn table 16 in the initial state.

Step ST1: the disc tray (e.g., the disc tray 1a ) is selected and the disc tray is conveyed by the tray conveying robot 12.

Step ST2: the discs 5 are loaded into the disc drives 13 by the disc conveying pickers 15. Then, the disc drives 13 perform recording or reproduction on/of the loaded discs 5.

Step ST3: while recording or reproduction on/of the discs 5 in the first disc tray is performed, the next disc tray (e.g., the disc tray 1b ) is selected, and the selected next disc tray is conveyed by the tray conveying robot 12. The next disc tray is placed on the turn table 16.

Step St4: when recording or reproduction is finished, the disc conveying pickers 15 return the discs 5 to the first disc tray.

Step ST5: the turn table 16 is half-rotated, and the next disc tray is located at the vicinity of the disc conveying pickers 15.

Step ST6: the discs 5 of the next disc tray are loaded into the disc drives 13 by the disc conveying pickers 15. Then, the disc drives 13 perform recording or reproduction on/of the loaded discs 5. Then, the processing returns to Step ST3 (select and convey the next disc tray), and the above-mentioned processing is repeated.

In an embodiment of the present technology, because the next disc tray is placed on the turn table 16 while recording or reproducing is performed on the discs 5 in the disc tray as described above, switching of the disc tray can be performed by a time necessary for half-rotating the turn table 16, and thus, it is possible to reduce the switching time.

Further, because (4 columns×16 ) discs are housed in one disc tray, it is possible to switch many discs in a short time.

(Disc Conveying Picker and Pusher Unit)

Next, with reference to FIGS. 15 16,17A, 17B, and 17C, a pusher unit used when the disc 5 conveyed by the disc conveying picker 15 is placed on the drive tray 13a of the drive 13 will be described.

The disc conveying picker 15 takes out the stacked discs 5 (in the following description, description of the dummy disc 5' will be omitted although the dummy disc 5' is located at the top stage) from the disc tray 1, supports the discs 5, and conveys the discs 5 to a position in the vicinity of the drive 13. The pusher unit performs an operation to separate one disc and place the separated disc on the drive tray 13a through the cooperation with the disc conveying picker 15. As will be described later, the disc conveying picker 15 includes a plurality of claws provided at the same height position, a picker drive unit 15a provided with a driving source such as a plunger and a motor, and a picker mechanism unit 15b for moving the claws, in order to support/separate the disc 5.

The drive tray 13a of the disc drive 13 is opened, and the discs 5 held by the disc conveying picker 15 are located above (e.g., right above) the drive tray 13a. In this state, the disc conveying picker 15 performs an operation, a picker pusher 21 on which the disc 5 at the bottom stage is placed descends, and thus, the disc 5 is placed on the drive tray 13a.

FIG. 15 and FIG. 16 each show the state where a disc 5a is placed on the respective drive trays 13a Note that the disc placed on the drive tray 13a is referred to as the disc 5a for distinguishing it with other discs. The pusher unit includes the picker pusher 21 configured to freely ascend and descend. The center of the picker pusher 21 and the center of the disc conveying picker 15 are aligned with each other. The picker pusher 21 incudes a pusher 22 (see FIG. 17A) located at the tip thereof. Note that a line connecting the center of the disc conveying picker 15 and the center of the picker pusher 21 passes through the center of the central hole of the drive tray 13a.

As shown in part B and part C of FIG. 17, the pusher 22 located at the tip of the picker pusher 21 is provided with a plate-like projection in a cross shape, and a taper is formed at the tip of the plate-like projection. In the case where the pusher 22 is inserted into the central hole of a disc holding unit 23 of the disc conveying picker 15, the taper functions as a guide at the time of insertion.

The disc holding unit 23 of the disc conveying picker 15 has a cylindrical shape having an outer diameter slightly smaller than the diameter of the central hole of the disc 5, and includes four claws 24a , 24b , 24c , and 24d (referred to as the claw 24 when the claws do not need to be distinguished from each other) provided at the same height position on the outer peripheral surface of the disc holding unit 23, which freely project and retract. The claw 24 is operated by the picker drive unit 15a and the picker mechanism unit 15b provided above. Note that the number of claws 24 does not necessarily need to be 4.

17A and 17B each show the state where the claw 24 projects toward the outside of the disc holding unit 23 (hereinafter, referred to as the opened state). In this state, for example, the claw 24 is in contact with the inner non-signal area (referred to as the clamping area) of the disc 5 at the bottom of the held discs 5. Therefore, the stacked discs 5 are supported by the claw 24.

FIG.17C shows the state where the claw 24 recedes into the Disc holding unit 23 (hereinafter, referred to as the closed state). In this state, the disc 5 is not supported by the claw 24. A separated disc 5 is brought into contact with a flange portion of the pusher 22 provided below and supported. In this case, the claw 24 is in the opened state at the position between the disc 5 at the bottom stage and another disc 5 directly thereabove. Therefore, the pusher 22 descends, thereby separating only the disc 5 at the bottom stage. The separated disc 5 is supported by the pusher 22.

As described above, the pusher 22 of the picker pusher 21 is inserted into the central hole of the disc holding unit 23. A space between the pusher 22 and the disc holding unit 23 is reduced by reducing the difference between the outer diameter of the pusher 22 and the inner diameter of the central hole of the disc holding unit 23. By providing the pusher 22, it is possible to prevent the disc 5 from being laterally displaced at the time when the claw 24 is operated. Therefore, it is possible to prevent the stacked discs from coming off from the claw 24 and dropping due to lateral displacement while the disc conveying picker 15 conveys the discs. Further, because the four claws 24 at the same height position are operated in synchronization with each other, it is easy to perform open/close control of the claw as compared with the case where two types of claws are provided at a different position, and the two types of claws are separately operated.

(Operation of Disc Conveying Picker and Pusher Unit)

Next, with reference to FIGS. 18A, 18B, 18C, 19A, 19B, 19C, and 19D, an operation in which one disc is separated from the disc conveying picker 15 and the separated disc is placed on the drive tray 13a of the disc drive 13 will be described. The operation of the picker pusher 21 (the pusher 22) and the operation of the claw 24 will be described in the order of part A, part B, and then part FIG. 18C. The operation of the picker pusher 21 (the pusher 22) and the operation of the claw 24 will be described in the order of FIGS. 19A, 19B, 19C, and 19D.

The drive tray 13a of the drive 13 is opened from the main body (FIG. 18A). The claw 24 is in the opened state, and the claw 24 is in contact with the clamping area of the disc 5 at the bottom stage to hold the discs 5. The picker pusher 21 is located below the drive tray 13a.

Next, as shown in part FIG. 18B, the picker pusher 21 is raised upward, passing through the central hole of the drive tray 13a, the pusher 22 is inserted into the central hole of the disc holding unit 23, and the flange portion of the pusher 22 comes close to or in contact with the disc 5 at the bottom stage. The state shown in FIG. 18B is the above-mentioned state shown in Figs. 17A and 17B. In this state, the claw 24 comes in the closed state, thereby separating the disc 5. Then, the position of the claw 24 moves up by the amount corresponding to the thickness of one disc 5, and the claw 24 comes in the opened state at the position of the lower surface of the disc 5 at the second from the bottom.

Next, as shown in FIG. 18C, the picker pusher 21 moves down, passing through the central hole of the drive tray 13a. The disc 5 that has been placed on the pusher 22 is placed on the drive tray 13a in the middle of movement. As described above, the disc at the bottom stage of the stacked discs 5 is separated and placed on the drive tray 13a.

Figure 19A:
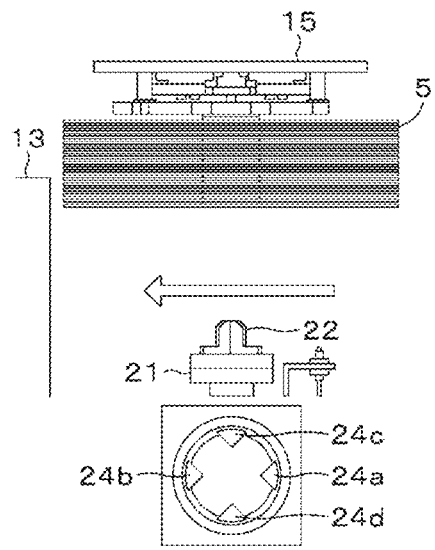

Description is made with reference to FIGS. 19A, 19B, 19C, and 19D. As shown in FIG. 19A, the drive tray 13a is closed inside the main body of the drive 13, the disc 5a is rotated by a spindle motor, and data is read/written from/to the disc 5a by the drive 13. Note that the disc at the second from the bottom is similarly loaded into another drive at the upper or lower stage. After that, a disc is separated from the top or bottom one by one, and loaded into a separate drive.

Figure 19B:
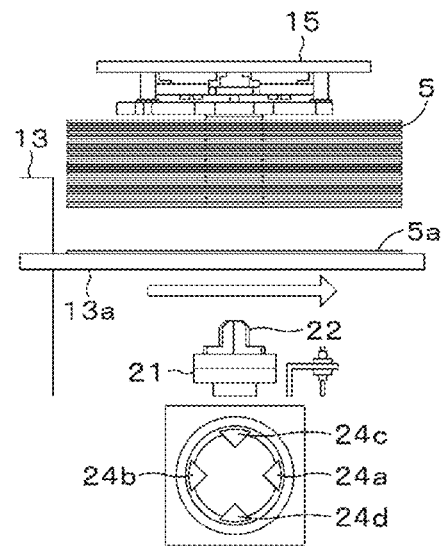

When reading or writing of data from/to the disc 5a is finished, unloading is performed. As shown in FIG. 19B, the drive tray 13a on which the disc 5a is placed is opened from the main body of the drive 13. The disc conveying picker 15 is located right above the drive tray 13a.

Figure 19C:
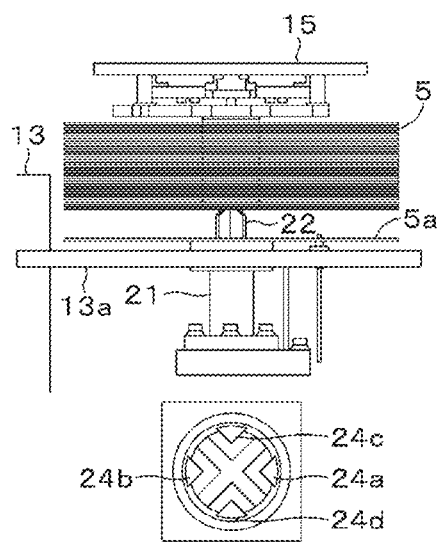

As shown in FIG. 19C, the picker pusher 21 is raised upward, and the disc 5a on the drive tray 13a is supported by the flange portion of the pusher 22. When the picker pusher 21 passes through the central hole of the drive tray 13a and further moves up, the disc 5a is raised above the drive tray 13a.

Figure 19D:
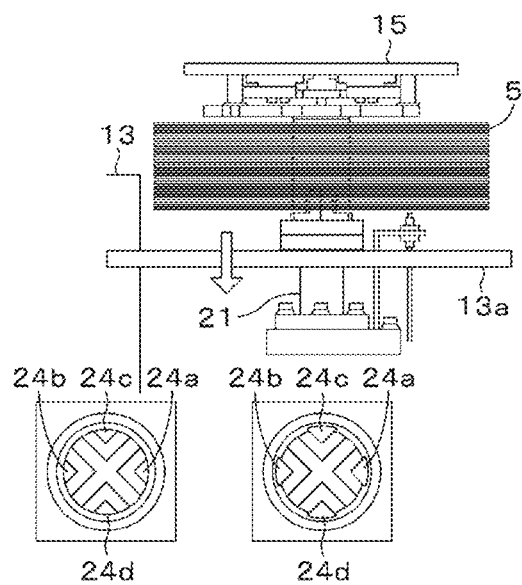

As shown in FIG. 19D, the picker pusher 21 further ascends, and the disc on the drive tray 13a is pressed against the bottom surface of the stacked disc 5. Then, while the picker pusher 21 ascends, the claw 24 comes in the closed state from the opened state in which the disc 5 at the second from the bottom is supported from below. As a result, the stacked discs 5 are supported by the flange portion of the pusher 22. In this state, the position of the claw 24 moves down, and the claw 24 comes in the opened state at the position of the lower surface of the disc 5 at the bottom (the disc 5a that has been on the drive tray 13a). Therefore, the discs 5 are supported by the claw 24.

After that, the picker pusher 21 descends, and the drive tray 13a is closed inside the main body. Note that unloading of the disc is performed in the order from the last-loaded disc (the disc at the top or bottom stage) to the first-loaded disc (the disc at the bottom or top stage) in the discs. Specifically, unloading is performed in the opposite order of the loading.

(Disc Cover)

As described above, since the dummy disc 5' is placed on the top stage of the discs 5 housed in the disc tray 1, dust is prevented from attaching to the disc 5. When the disc tray 1 is housed in the shelf of the disc tray rack 11, there is a small space between the upper surface (opening surface) of the disc tray 1 and the bottom surface of another upper disc tray 1. If large vibration such as an earthquake is generated in the disc tray rack 11, the dummy disc 5' may pop out from the disc tray 1 and drop.

In order to resolve such a problem, a disc cover 31 shown in FIGS. 20A 20B, and 20C may be used instead of the dummy disc 5'. The disc cover 31 includes a central opening 32 that is similar to that of the disc 5 and formed on the main surface thereof, leg portions 33a, 33b, 33c, and 33d (referred to as the leg portion 33 when the leg portions do not need to be distinguished from each other) that project from the four outer corners on the back surface, and holes 34a and 34b formed at two positions in the diagonal direction.

As shown in FIG. 21, disc covers 31a, 31b, 31c, and 31d cover the surfaces of discs stacked in the housing concave portions of the enclosure 2 of the disc tray 1. The above-mentioned leg portion 33 is engaged with a part, e.g., a projection formed on each housing concave portion. The length of the leg portion 33 is slightly larger than the width of the space between the upper surface of the disc tray 1 and the bottom surface of the upper disc tray 1 when the disc tray 1 is housed in the disc tray rack 11. Since it includes such a leg portion 33, it is possible to prevent the disc covers 31a to 31d from dropping through the space even if the disc covers 31a to 31d are vibrated. Note that it is possible to prevent the disc covers 31a to 31d from dropping not only in the state where the disc tray 1 is housed in the disc tray rack 11 but also in the case where the tray conveying robot 12 conveys the disc tray 1.

Further, as shown in FIG. 21, taper pins (not shown) formed on the lower side of an arm unit of the picker 15 are inserted into the holes 34a and 34b. The taper pins are engaged with the holes 34*a* and 34*b*, thereby preventing the disc covers 31*a* to 31*d* from rotating.

(Falling Prevention Mechanism of Tray Conveying Robot)

In the state where the disc tray 1 is housed in the disc tray rack 11, the bottom surface of another upper disc tray 1 blocks the upper open space. Therefore, it is possible to prevent the disc covers 31*a* to 31*d* from popping out. However, when the tray conveying robot 12 takes out the disc tray 1 from the disc tray rack 11 and conveys the disc tray 1, there is no regulation for the upper part. Therefore, the disc cover 31 and the disc 5 may pop out from the disc tray rack 11.

As shown in FIG. 22, the tray conveying robot 12 includes a disc tray holding unit 41 that holds the disc tray 1. The disc tray 1 is inserted into the disc tray holding unit 41 from the side surface opening, slides, and is arranged at a predetermined position thereof. On the upper surface of the disc tray holding unit 41, a roof-shaped stopper 42 is vertically movably provided. The length of the stopper 42 is slightly shorter than the length of the disc tray 1 in the longitudinal direction. As shown in FIG. 23, which is an enlarged view of the part surrounded by a circle in FIG. 22, a solenoid 43 causes the stopper 42 to vertically move. At the position at which the stopper 42 has descended, a space is formed between the lower surface of the stopper 42 and the upper surface of the disc tray 1. This space is shorter than the length of the leg portion 33.

Since the stopper 42 is provided, it is possible to prevent the disc cover 31 and the disc 5 from popping out. Further, it is also possible to prevent the disc tray 1 from popping out from the disc tray holding unit 41. Note that the reason why the solenoid 43 causes the stopper 42 to vertically move is to prevent it from colliding with a pin provided to the turn table 16 when the disc tray 1 is delivered to the turn table 16, as will be described later.

(Falling Prevention Mechanism of Turn Table)

FIG. 24 is a perspective view showing a part of the turn table 16, and FIG. 25 is an enlarged view of the part surrounded by a circle in FIG. 24. As described above, the turn table 16 is rotatable, the disc tray 1*a* on the first area of the turn table 16 is a target of processing including recording or reproduction, and the selected next disc tray 1*b* is placed on the second area of the turn table 16. A roof-shaped stopper 44 is provided to the second area. The disc tray is delivered between the second area and the tray conveying robot 12.

The stopper 44 includes a plate-like member slightly longer than the length of the disc tray 1*b* in the longitudinal direction, and both ends thereof are supported by arms 45*a* and 45*b*. The arms 45*a* and 45*b* are respectively coupled to drive axes of solenoids 46*a* and 46*b*, and the stopper 44 vertically moves by the solenoids 46*a* and 46*b*. At the position at which the stopper 44 has descended, a space is formed between the lower surface of the stopper 44 and the upper surface of the disc tray 1. This space is shorter than the length of the leg portion 33.

Since the stopper 44 is provided, it is possible to prevent the disc cover 31 and the disc 5 from popping out. Further, it is also possible to prevent the disc tray 1 from popping out from the turn table 16. Note that the reason why the solenoids 46*a* and 46*b* cause the stopper 44 to vertically move is to prevent it from colliding with the disc tray 1 on the tray conveying robot 12 when the disc tray 1 is received by the turn table 16, as will be described later.

(Delivery Operation of Disc Tray)

FIGS. 26 to 30 each show a series of operations in time series, in which the tray conveying robot 12 delivers the disc tray 1*b* to the turn table 16. In the state shown in FIG. 26, the stopper 42 of the tray conveying robot 12 is located at a lower position, and blocks the upper portion of the disc tray 1*b*. The tray conveying robot 12 approaches the turn table 16 as shown by an arrow. The turn table 16 includes a plate-like disc tray placing unit 47. On the disc tray placing unit 47, a plurality of position regulation pins 48 are erected from the lower surface.

As shown in FIG. 27, the tray conveying robot 12 further approaches the turn table 16. At this time, the stopper 42 of the tray conveying robot 12 ascends by the solenoid 43 and thus moves to an upper position. Further, as shown in FIG. 28, the stopper 44 of the turn table 16 ascends by the solenoid 46*a* (46*b*).

Further, as shown in FIG. 29, the tray conveying robot 12 approaches the turn table 16, and the disc tray 1*b* enters between the tray placing unit 47 of the turn table 16 and the stopper 44.

Then, when the disc tray 1*b* descends by the tray conveying robot 12, the holes formed on the bottom surface of the disc tray 1*b* are fit into the pins 48, and thus, the disc tray 1*b* is placed on the tray placing unit 47. In this case, as shown in FIG. 30, also the stopper 44 of the turn table 16 descends substantially simultaneously with the descending of the disc tray 1*b*, and a gap between the disc tray 1*b* and the stopper 44 is kept substantially constant.

Through the series of operations, the disc tray 1*b* is delivered from the tray conveying robot 12 to the turn table 16. Then, as shown in FIG. 31, the tray conveying robot 12 moves away from the turn table 16 as shown by an arrow. Description of the subsequent operation is omitted for simplification. Since the upper portion of the disc tray is blocked by the stoppers 42 and 44, it is possible to prevent the disc cover 31 and the disc 5 from popping out from the disc tray 1 and the disc tray 1 from dropping.

<2. Modified Example>

Although embodiments of the present technology have been specifically described, the embodiments of the present technology are not limited to the above-mentioned embodiments and various modifications can be made without departing from the essence of the present technology. For example, in the present technology, the disc tray does not necessarily need to include a center pole.

Further, the structures, methods, processes, shapes, materials, numerical values, and the like of the above embodiments can be combined with each other without departing from the essence of the present technology.

It should be noted that the present technology may take the following configurations.

(1)

A disc archive apparatus, including:

disc trays each capable of housing N columns of M stacked discs (N and M each indicate a positive integer not less than two);

one or more disc tray racks that each house the disc trays;

a tray conveying robot that selects a specified disc tray from the one or more disc tray racks and conveys the specified disc tray;

a rotatable turn table, the disc tray conveyed by the tray conveying robot being placed on the rotatable turn table;

a disc drive including a plurality of drives arranged in an (M×N) matrix pattern;

a disc conveying picker for placing the discs from the disc tray placed on the turn table into the plurality of drives of the disc drive, the disc conveying picker being between the turn table and the disc drive; and a controller that controls an operation, in which the controller performs a control operation including performing processing including recording or reproduction on/from the disc taken out from a disc tray currently placed on a first area of the turn table, rotating the turn table thereafter, and performing processing including recording or reproduction on/from a next disc tray placed on a second area of the turn table.

(2)
The disc archive apparatus according to (1), in which the controller performs a control operation including selecting the next disc tray by the tray conveying robot while performing the processing including recording or reproduction on/from the disc taken out from the disc tray currently placed on the first area of the turn table, and placing the selected next disc tray on the second area of the turn table.

(3)
The disc archive apparatus according to (1) or (2), in which the discs housed in the disc tray each include a rib, the rib being formed around a central opening of each disc, a width of the rib being determined such that there is a space between upper and lower discs even when an eccentricity of the discs housed in the disc tray occurs.

(4)
The disc archive apparatus according to (3), in which the rib having the same shape is formed on the same position of each of both surfaces of each disc.

(5)
The disc archive apparatus according to any one of (1) to (4), in which the disc tray has a case opening, the case opening being covered by a film when the discs are housed in the disc tray.

(6)
The disc archive apparatus according to any one of (1) to (5), in which the disc tray includes a cover arranged on a top disc of each column of the stacked discs.

(7)
The disc archive apparatus according to (1) to (6), in which the cover includes a main surface and a leg portion, the main surface having a substantially same shape as that of the disc, the leg portion projecting from the main surface, the leg portion being engaged with a part of a case.

(8)
The disc archive apparatus according to any one of (1) to (7), in which the turn table includes the first area and the second area, a diameter of the turn table being a boundary between the first area and the second area, and the disc tray is switched by half-rotation of the turn table.

(9)
The disc archive apparatus according to any one of (1) to (8), in which the disc conveying picker takes out a plurality of discs from each of M columns of the discs housed in the disc tray placed on the first area of the turn table, and holds the taken-out discs, and a disc separated from the plurality of discs is placed on a drive tray of the respective drives in each column of the disc drive one by one.

(10)
The disc archive apparatus according to any one of (1) to (9), in which the disc conveying picker corrects a difference between a distance between centers of the discs and a distance between the drives in each column of the disc drive, the discs being housed in the disc tray.

(11)
The disc archive apparatus according to (8), in which the disc conveying picker includes a cylindrical portion and a plurality of claws, the cylindrical portion being put in central holes of the stacked discs, the claws being provided at a substantially same height position, the claws freely projecting toward outside from a peripheral surface of the cylindrical portion, the discs being supported and separated by opening and closing of the claws.

(12)
The disc archive apparatus according to (9) or (11), further including a pusher unit provided below the disc conveying picker, the pusher unit being vertically movable, in which one separated disc from the disc conveying picker is placed on the pusher unit, and the disc is placed on the drive tray by descending of the pusher unit on which the separated disc is placed.

(13)
The disc archive apparatus according to (9), (11) or (12), further including a claw driving mechanism that operates the claws, in which the claw driving mechanism opens the claws in a state where the pusher unit is located below the drive tray, and closes the claws in a state where a tip of the pusher unit passes through a central hole of the drive tray, is inserted into a central hole of the disc conveying picker, and comes close to or in contact with a lower surface of a bottom disc.

DESCRIPTION OF REFERENCE NUMERALS 1 disc tray
2 enclosure
5 disc
6 film
7 rib
11 disc tray rack
12 tray conveying robot
13 disc drive
13a drive tray
15 disc conveying picker
16 turn table
21 picker pusher
22 pusher
24a to 24d claw
31 disc cover
33a to 33d leg portion
42, 44 stopper
43, 48 solenoid

The invention claimed is:
1. A disc archive apparatus, comprising:
a plurality of disc trays,
wherein each disc tray of the plurality of disc trays is configured to house N columns of M stacked discs (N and M each indicate a positive integer not less than two);
one or more disc tray racks each configured to house the plurality of disc trays;

a tray conveying robot configured to:
  select a specified disc tray of the plurality of disc trays from the one or more disc tray racks; and
  convey the specified disc tray;
a rotatable turn table, wherein the specified disc tray conveyed by the tray conveying robot is placed on the rotatable turn table;
a disc drive including a plurality of drives arranged in an (M×N) matrix pattern;
a disc conveying picker configured to place discs from the specified disc tray placed on the rotatable turn table into the plurality of drives of the disc drive,
wherein the disc conveying picker is between the rotatable turn table and the disc drive; and
a controller configured to:
  record or reproduce on/from a first disc taken out from a first disc tray of the plurality of disc trays,
    wherein the first disc tray is currently placed on a first area of the rotatable turn table;
  rotate the rotatable turn table, based on completion of the recording or the reproduction on/from the first disc taken out from the first disc tray; and
  record or reproduce on/from a second disc tray of the plurality of disc trays,
    wherein the second disc tray is next to the first disc tray currently placed on the first area of the rotatable turn table, and
    wherein the second disc tray is placed on a second area of the rotatable turn table.

2. The disc archive apparatus according to claim 1, wherein
the controller is further configured to:
select the second disc tray by the tray conveying robot while recording or reproducing on/from the first disc taken out from the first disc tray currently placed on the first area of the rotatable turn table; and
place the selected second disc tray on the second area of the rotatable turn table.

3. The disc archive apparatus according to claim 1, wherein
each disc of the stacked discs housed in the each disc tray of the plurality of disc trays includes a rib around a central opening of the each disc, and
a width of the rib is determined such that there is a space between upper discs and lower discs even with occurrence of an eccentricity of the stacked discs housed in the each disc tray.

4. The disc archive apparatus according to claim 3, wherein
the rib having a same shape is formed on a same position of each surface of both surfaces of the each disc.

5. The disc archive apparatus according to claim 1, wherein
a disc tray of the plurality of disc trays has a case opening, and
the case opening is covered by a film when the stacked discs are housed in the disc tray.

6. The disc archive apparatus according to claim 1, wherein
a disc tray of the plurality of disc trays includes a cover on a top disc of each column of the stacked discs.

7. The disc archive apparatus according to claim 6, wherein
the cover includes a main surface and a leg portion,
the main surface has a substantially same shape as that of the stacked discs, and
the leg portion is configured to:
  project from the main surface; and
  engage with a part of a case.

8. The disc archive apparatus according to claim 1, wherein
the rotatable turn table includes the first area and the second area,
a diameter of the rotatable turn table is a boundary between the first area and the second area, and
a disc tray of the plurality of disc trays is configured to be switched based on half-rotation of the rotatable turn table.

9. The disc archive apparatus according to claim 1, wherein
the disc conveying picker is further configured to:
  take out a plurality of discs from each column of the N columns of the stacked discs housed in the first disc tray placed on the first area of the rotatable turn table;
  hold the plurality of discs taken out; and
  place a second disc separated from the plurality of discs on a drive tray of the respective plurality of drives in each column of the disc drive one by one.

10. The disc archive apparatus according to claim 9, wherein
the disc conveying picker includes a cylindrical portion and a plurality of claws,
the cylindrical portion is put in central holes of the stacked discs,
the plurality of claws is at a substantially same height position,
the plurality of claws is configured to freely project toward outside from a peripheral surface of the cylindrical portion, and
the discs are supported and separated based on opening and closure of the plurality of claws.

11. The disc archive apparatus according to claim 10, further comprising
a pusher unit below the disc conveying picker, the pusher unit being vertically movable, wherein
  the second disc separated by the disc conveying picker is placed on the pusher unit, and
  the second disc is placed on the drive tray based on descend of the pusher unit on which the second disc is placed.

12. The disc archive apparatus according to claim 11, further comprising
a claw driving mechanism configured to:
  operate the plurality of claws;
  open the plurality of claws in a first state where the pusher unit is located below the drive tray; and
  close the plurality of claws in a second state where a tip of the pusher unit passes through a central hole of the drive tray, is inserted into a central hole of the disc conveying picker, and comes close to or in contact with a lower surface of a bottom disc.

13. The disc archive apparatus according to claim 1, wherein
the disc conveying picker is further configured to correct a difference between a distance between centers of the stacked discs and a distance between the plurality of drives in each column of the disc drive, and
the stacked discs are housed in the specified disc tray.

* * * * *